United States Patent [19]

Ting

[11] Patent Number: 5,421,540
[45] Date of Patent: Jun. 6, 1995

[54] METHOD AND APPARATUS FOR DISPOSAL/RECOVERY OF ORBITING SPACE DEBRIS

[76] Inventor: Paul C. Ting, 831 Fern Springs Ct., Houston, Tex. 77062

[21] Appl. No.: 937,057

[22] Filed: Aug. 26, 1992

[51] Int. Cl.$^6$ .................... B64G 1/22; B64G 1/62
[52] U.S. Cl. .................... 244/163; 244/158 A; 244/160
[58] Field of Search ............... 244/158 R, 158 A, 159, 244/160, 161, 163

[56] References Cited

U.S. PATENT DOCUMENTS

| | | | |
|---|---|---|---|
| 3,596,853 | 8/1971 | Anderson | 244/160 |
| 3,652,042 | 3/1972 | Welther | 244/158 R |
| 3,907,225 | 9/1975 | Welther | 244/158 R |
| 4,334,816 | 6/1982 | Slysh | 244/159 |
| 4,750,692 | 6/1988 | Howard | 244/161 |
| 4,991,799 | 11/1990 | Petro | 244/158 R |

FOREIGN PATENT DOCUMENTS

| | | | |
|---|---|---|---|
| 0249600 | 10/1989 | Japan | 244/159 |
| 0024073 | 1/1990 | Japan | 244/161 |

OTHER PUBLICATIONS

Long Jr. et al. "Remote Pilot-controlled docking with television" NASA TN D-3044 Oct. 25, 1965.
Prediction of Aerodynamic Heating and Pressures on Shuttle Entry Air Data System (SEADS) Nose Cap and Comparison with STS-61C Flight Data, *First International Conference on Hypersonic Flight in the 21st Century*, Sep. 20-23, 1988, Grand Forks, N.D., U.S.A.
Aerothermodynamic Environments for Mars Entry, Mars Return, and Lunar Return Aerobraking Missions, *AIAA/ASME 5th Joint Thermophysics and Heat Transfer Conference*, Jun. 18-20, 1990, Seattle, Wash.
Development of AFE Aerobrake Aerothermodynamic Data Book, *AIAA 24th Thermophysics Conference*, Jun. 12-14, 1989, Buffalo, N.Y.
Aerodynamic Heating on AFE Due to Nonequilibrium Flow with Variable Entropy at Boundary Layer Edge, *First European Symposium on Aerothermodynamics for Space Vehicles*, 28-30 May, 1991, Estec, Noordwijk, The Netherlands.
Aeroassist Flight Experiment Heating-Rate Sensitivity Study, AIAA, (reprinted from) *Journal of Thermophysics and Heat Transfer*, vol. 5, No. 4, Oct.-Dec. 1991, pp. 456-462.

(List continued on next page.)

*Primary Examiner*—Michael S. Huppert
*Assistant Examiner*—Virna Lissi Ansley
*Attorney, Agent, or Firm*—James L. Jackson

[57] ABSTRACT

Method and apparatus for elimination of space debris from Earth orbit to thus minimize the hazards to space personnel and equipment that are now present as increasing as space exploration and use continues. As a first aspect space debris is collected and deorbited where it is completely burned by the heat developed by the kinetic energy of its reentry through the Earth's atmosphere. As a second aspect, valuable space debris is collected and deorbited in a recovery reentry vehicle and which lands at a designated site on the Earth's surface. A third method includes parking collected space debris in a designated parking orbit at a location well away from traveled orbit zones, including a high, relatively unused orbit sector. A fourth method includes solar and laser energy destruction of the non-valuable space debris while in orbit. A fifth aspect of this invention contemplates ejecting collected, containerized space debris from Earth orbit to an interplanetary orbit that does not intersect any planet of this solar system. The last method is to immediately remove the space debris after any new activities in space.

32 Claims, 15 Drawing Sheets

OTHER PUBLICATIONS

Aerodynamic Heating Environment on Orbiter Nose Cap with Dissimilar Surface Materials, *8th Annual Science & Engineering Technical Symposium*, May 24–25, 1986, Houston, Tex.

Autonomous Space Processor for Orbital Debris, Final Report (1988–89), *NASA-CR-186043, Autonomous Space Processor for Orbital Debris, Arizona University*, 1988–1989, Ariz., U.S.A.

Aerodynamic Heating on AFE Due to Non-Equilibrium Flow with Variable Entropy at Boundary Layer Edge, *First European Symposium on Aerothermodynamics for Space Vehicles*, 28–30 May, 1991, Estec, Noordwijk, The Netherlands.

First European Symposium on Aerothermodynamics for Space Vehicles, *First European Symposium on Aerothermodynamics for Space Vehicles*, 28–30 May, 1991, Estec, Noordwijk, The Netherlands.

Comparison of Viscous Shock Layer and Boundary Layer Reentry Heating Techniques for Orbiter Nose Cap, *AIAA*-86-1350, Jun. 2–4, 1986, Boston, Mass.

Shuttle Entry Air Data System (SEADS) Columbium Pressure Port Preflight Testing and Analysis, *AIAA*-8-5-1021, Jun. 19–21, 1984, Williamsburg, Va.

Technical Aspects of the Control of Space Debris, *41st Congress of the International Astronautical Federation*, Oct. 6–12, 1990, Dresden, GDR.

Orbital Transfer Vehicle Operations for Orbital Debris Hazard Mitigation, *IAA*-86-422, A87, 16082.

Outer Space Activities versus Outer Space, *Lubos Perek*-A80-30605.

Special Studies and Analyses, *Commerce Business Daily*, Issue No. PSA, 0643, Thursday, Jul. 23, 1992.

Thermodynamic Energy Balance Equations for Space Shuttle Orbiter Gas Compartment During Ascent and Re-Entry, *AIAA*-82-0844, Jun. 7–11, 1982, St. Louis, Mo.

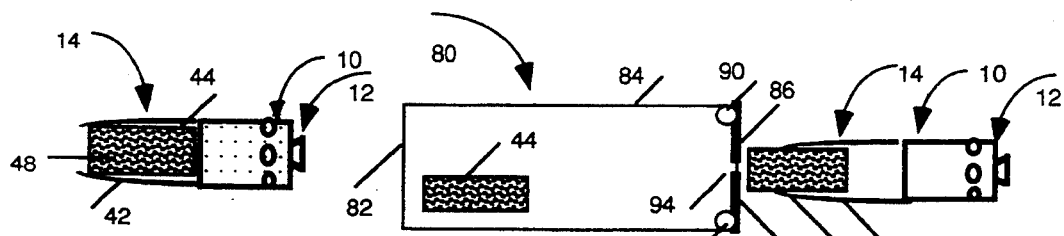
FIG. 4a  FIG. 4b
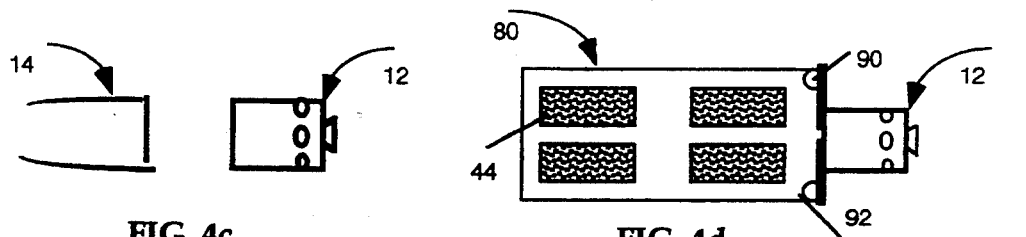
FIG. 4c  FIG. 4d
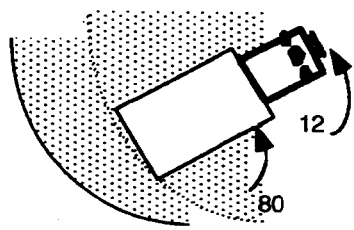 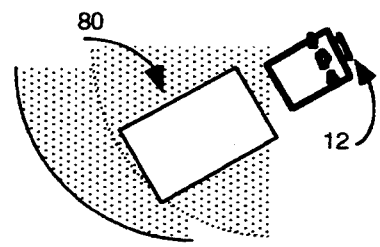
FIG. 4e  FIG. 4f
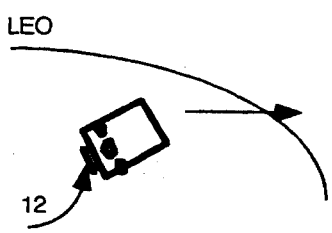 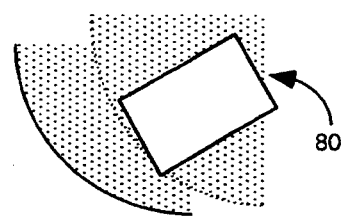
FIG. 4g  FIG. 4h
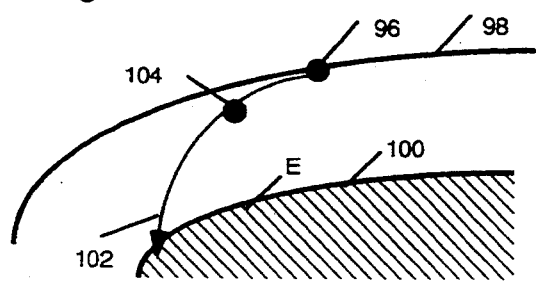
FIG. 4i FIG.5a-1
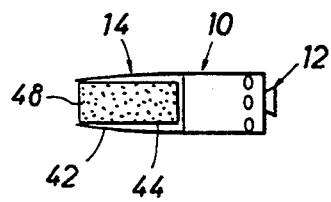
FIG.5a-2
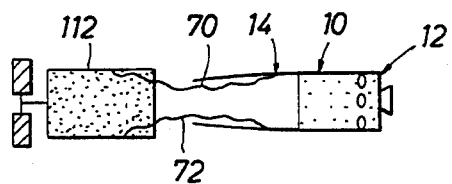
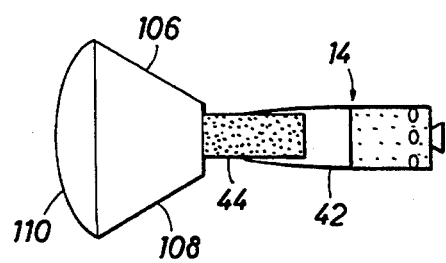
FIG.5b-1
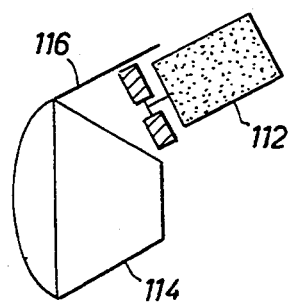
FIG.5b-2
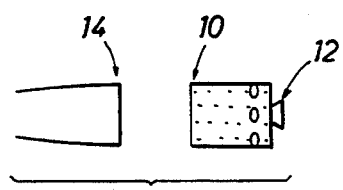
FIG.5c
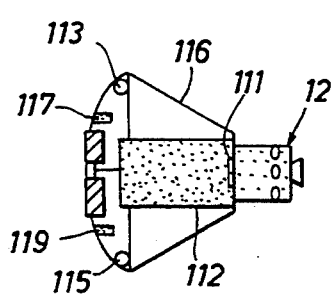
FIG.5d
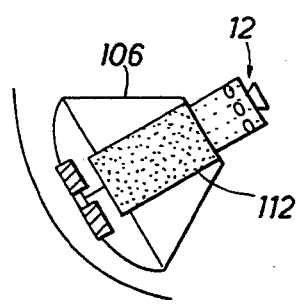
FIG.5e
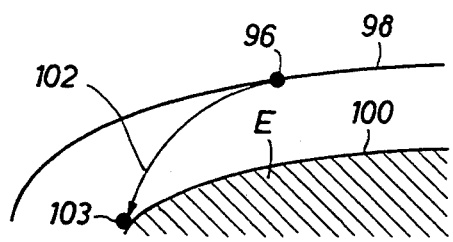
FIG.5f FIG.6a-1
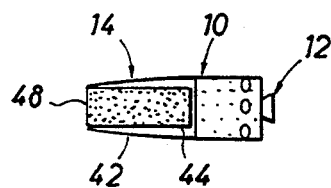
FIG.6a-2
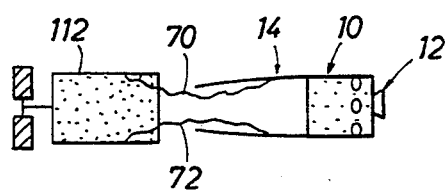
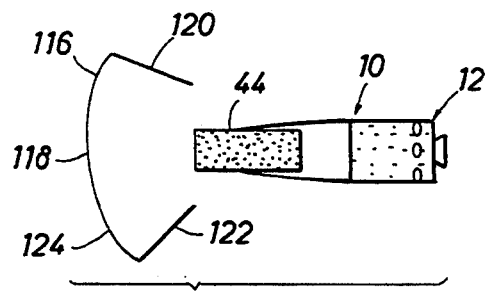
FIG.6b-1
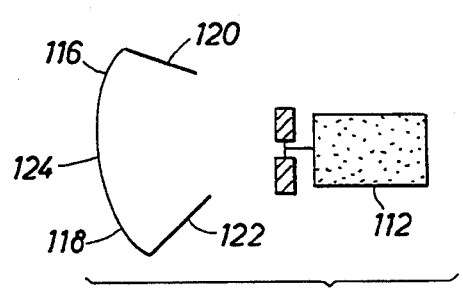
FIG.6b-2
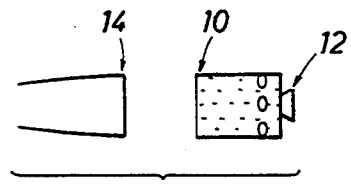
FIG.6c
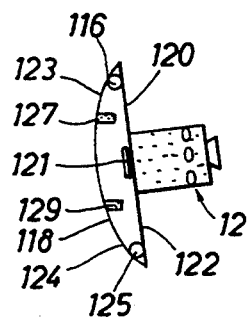
FIG.6d
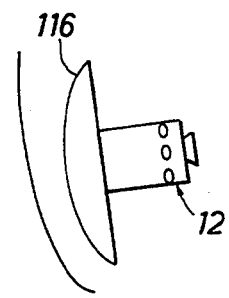
FIG.6e
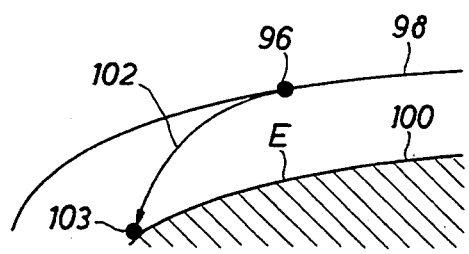
FIG.6f FIG.8a-1
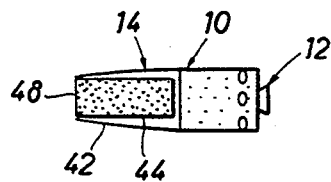
FIG.8a-2
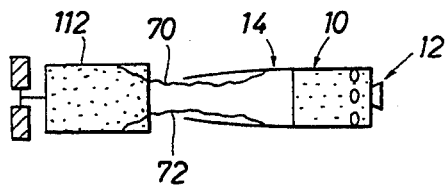
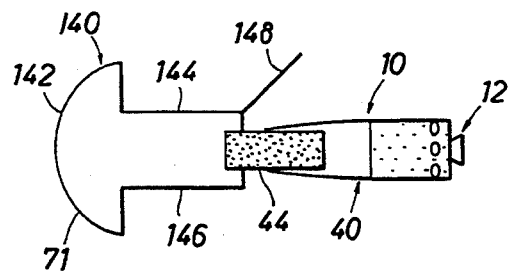
FIG.8b-1
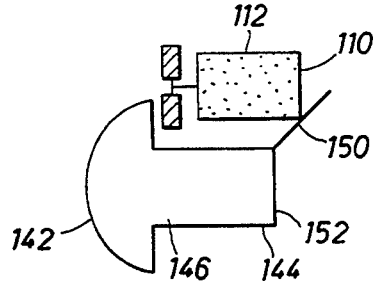
FIG.8b-2
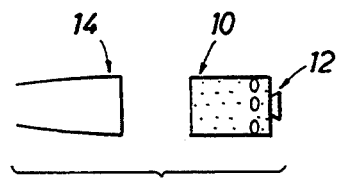
FIG.8c
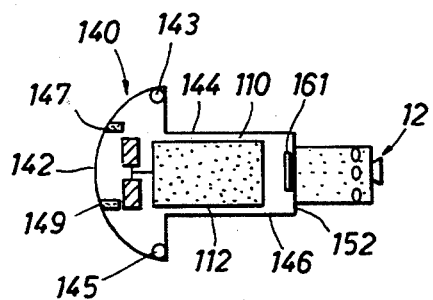
FIG.8e
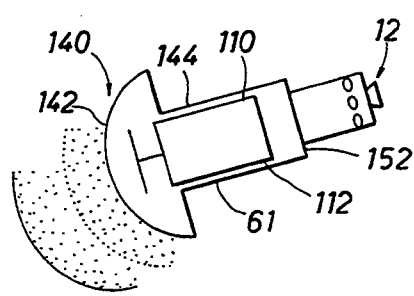
FIG.8d
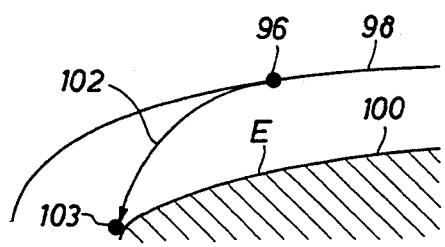
FIG.8f FIG.9a-1
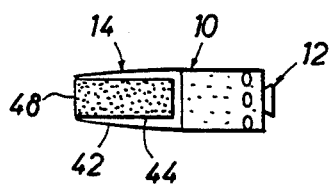
FIG.9a-2
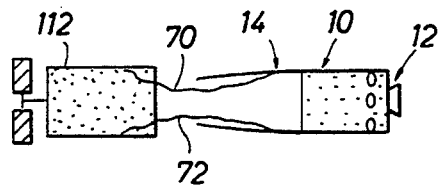
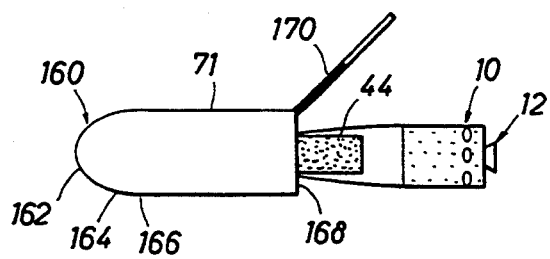
FIG.9b-1
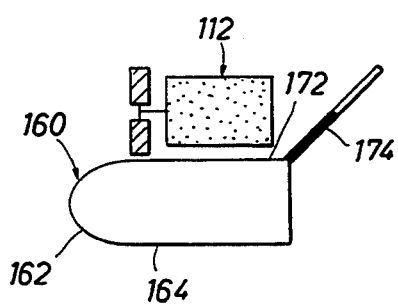
FIG.9b-2
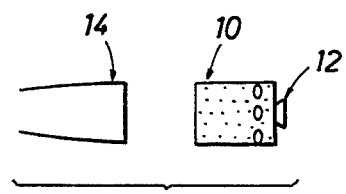
FIG.9c
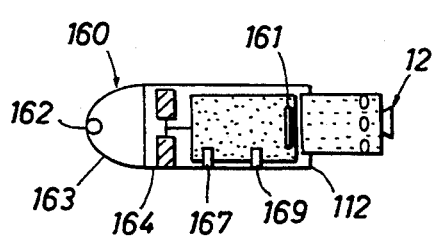
FIG.9d
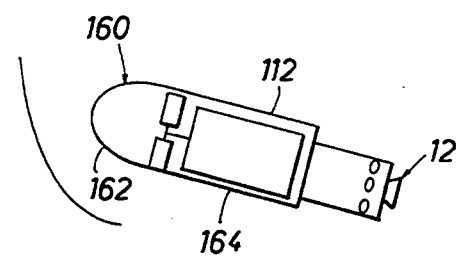
FIG.9e
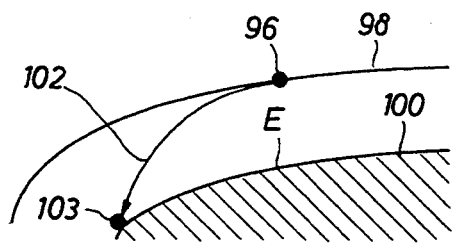
FIG.9f

METHOD AND APPARATUS FOR DISPOSAL/RECOVERY OF ORBITING SPACE DEBRIS

FIELD OF THE INVENTION

This invention relates generally to the field of space exploration and more particularly to the safety of spacecraft operations including launch, acquisition of orbital and escape velocities, re-entry through the immediate spacial and atmospheric proximity of the Earth and orbital activities. More specifically, the present invention concerns effective and efficient capture and recovery or disposal of orbiting space debris to ensure against possible collision with the space debris during spacecraft operations.

BACKGROUND OF THE INVENTION

For the purposes of the present invention the term "spacecraft" is intended to encompass a wide variety of manned and unmanned space vehicles including, but not limited to vehicles for manned space travel, satellites, space stations, vehicles for deployment and recovery of satellites, etc.

The term "space debris" as used in this specification is intended as a broad term encompassing dead or inactive satellites, sections of space vehicle launching equipment, small fragments and components jettisoned from spacecraft and launching equipment, all of which having maintained orbital velocity. The term "space debris" includes all objects large and small which have been placed in orbit by space related activities of any kind and which are desired to be eliminated from orbit.

Human exploration of space, deployment of different satellites, vehicles, missiles and research laboratories and utilization of the non-gravitational force feature of space for product experimentation have been in progression for almost three and one-half decades by the United States, Commonwealth of Independent States (CIS), formerly the Soviet Union (USSR), France, Germany, China, Japan, Israel and some other countries since the Soviet Union deployed its first satellite "Sputnik" on Oct. 4, 1957. As space activities occur, a variety of unneeded objects, some large, many quite small, all typically referred to as "space debris" can remain in orbit for extended periods of time. As the result of space activities thus far, the number of orbiting objects, i.e., in lower Earth orbit (LEO) and geosynchronous Earth orbit (GEO) as well as the orbital zone between the LEO and GEO has been rapidly growing. The accumulation of space debris is creating more and more of a hazard and threat to spacecraft or satellites, space shuttles orbit during maneuvers in lower Earth orbit missions. The presence of space debris also compromises the safety of astronauts, especially during EVA activities that will be required for future construction of the Freedom Space Station. According to the current paper of Thomas E. Albert and William B. Margopoulos (IAA90-568) "if actions to minimize the generation of debris are not globally implemented, portions of the LEO region may become unacceptably hazardous for some missions within a few decades." In the same paper it is also mentioned "A math model has been developed to predict the effects of active removal as management option on the future catastrophic collision hazard to spacecraft." Today the leading European Aerospace countries as well as Japan are beginning to focus on the topic. It is inevitable that the space environment must be continuously cleaned to minimize the amount of space debris that can possibly collide with spacecraft and space stations that will be launched within the next few years. It is especially important, before further significant space activities take place that the international space community provide for efficient removal of space debris from the orbital zones that are frequently used for the launching and orbital activities of spacecraft.

Tremendous kinetic energy is generated during hypersonic flight of spacecraft which increases the aerodynamic heating values of the spacecraft. In the past three decades, research scientists have concentrated spacecraft design efforts on study of thermal protection systems. For example, an ablator was developed for use during the Apollo program for protection of spacecraft returning from the moon to Earth in the late 1960's and early 1970's) during their entry into the Earth's atmosphere. Later, thermal protection tiles were developed for the thermal protection of the reusable Orbiter during its hypersonic flight. If the thermal protection system either type of spacecraft was removed or inadequately designed, the spacecraft would be vaporized or melt due to aerodynamic heating converted from a tremendous kinetic energy build-up during its atmospheric entry.

In the past half century, thousands of space researchers and scientists have studied natural thermophysical and thermochemical phenomenon to continuously improve the design and safety of spacecraft. It has been determined through thermophysical and thermochemical calculations and through actual spacecraft re-entry that the surface temperature of a space vehicle during re-entry can reach 3,000° F. due to heat convection, conduction and radiation the first two terms which are converted from kinetic energy during hypersonic flight. Most of the inventor's work in this field was published in national and international leading thermophysics and heat transfer journals and conference proceedings. For example, the surface temperature of a space shuttle orbiter nose cone increases during re-entry to 2,800° F. when employing reinforcing carbon carbon (RCC) insulation and 3,000° F. at higher catalycity columbium surface. These results were indicated in one of the inventor's papers (First International Conference on Hypersonic Flight in the 21st Century, 1988). One part of the present invention will utilize this thermophysics phenomenon in the disposal of orbital space debris. The National Aeronautics and Space Administration (NASA) of the United States has initiated a study of the issue of space debris that has been generated by man's activities in space since the early 1970's. These studies have covered all aspects of the issue from the development of observation capabilities, through the modeling of the space environment and the characterization of break-up events, laboratory hypervelocity impact testing and the exposure of material in space. NASA also has a special radar, optical and infrared telescopes, GEODESS PALAPA, WESTAR spacecraft to obtain all space debris activities to date. This inventor is prepared to propose a handbook entitled "DEVELOPMENT OF NASA SPACE DEBRIS SAFETY" which will be beneficial internationally as well as for the United States' space programs.

The space debris vehicle system (SDVS) which contains the space debris vehicle (SDV) and various sizes of space debris containers including small space debris receptacles (SDR) and large space debris containers (SDC) and huge space debris holders (SDH). The SDVS may be directly launched to low Earth orbit by rocket or it may be deployed from a space shuttle orbiter to the particular orbit that is desired. Additional power will be required to move the SDV from low Earth orbit to higher orbit or geosynchronous Earth orbit. The SDV on board guidance control subsystem and remote video cameras will connect transmission signals with a ground tracking station, space station, or space shuttle orbiter. The SDV will then be maneuvered to intercept space debris that has been identified and located. After appropriate space debris has been acquired and consolidated, it will be deorbited for reentry into the Earth's atmosphere. The collected orbiting space debris will be initiated to deorbit from an altitude from about 400,000 feet for atmospheric reentry. Typically, the power subsystem and perhaps a majority of the space debris vehicle will be separated from the space debris container and will be restored to a suitable orbital zone for subsequent reuse. When its power supply is exhausted, it may also be destroyed by kinetic energy or otherwise removed from the orbital zone of interest. In some cases, the uninsulated space debris vehicle (SDV) and the uninsulated space debris container to which the SDV is attached will be melted or vaporized before the SDV descends to 300,000 feet, after a very short period of reentry. As an example of the tremendous heat that is developed as the result of the kinetic energy of re-entry, it should be born in mind that the giant external fuel tank (ET) which is used to supply fuel to the Orbiter during space shuttle Orbiter ascent is very large, having a length of 153.8 feet and a diameter of 28.5 feet. The ET was separated from the Orbiter at an altitude of approximately 240,000 feet and it was ruptured and became melted to vaporization at approximately 235,000 feet due to kinetic energy in the STS-29 mission. The SDVS will follow a pre-designated entry path, in all probability being the same entry path as was used for the external tank of the Orbiter, which directs any surviving portion of the debris to an area of low population density such as the Indian Ocean.

RECOVERY OF SPACE DEBRIS

Though it is essential that those sections from LEO to GEO which are frequently accessed by space vehicles must be cleaned of unnecessary space debris, it is also well known that certain space debris, inactive satellites for example, may have considerable value from the standpoint of reuse, salvage or scientific analysis. For example, satellites that have malfunctioned as the result of orbital insertion or for any other reason and which can not be restored to operation by astronauts while in Earth orbit, may nevertheless be of sufficient value to warrant recovery from orbit, repair, and subsequent orbital reinsertion. In some cases, the cause of satellite malfunction may be unknown for the reason that during real time missions, recording data cannot be transmitted to tracking stations and thus cannot be disseminated for malfunction determination. Moreover, it may be difficult or impractical for astronauts to gain access to inactive satellites for the purpose of removing and retrieving its flight recorder so that the data stored in the recorder may be recovered and processed. Further, it may be very difficult and expensive for the orbiter to carry with it sufficient equipment for satellite repair.

Orbitable space vehicles, such as the current "Orbiter" space shuttle vehicles being employed by the United States for orbital space operations, have been employed to repair inactive satellites in space and they have also been employed to recover a inactive satellites and return them to Earth for renovation. Obviously, this is a very expensive procedure which adds considerably to the costs of the satellites. Thus the value of the satellites, especially when recovered and restored, must offset the costs of recovery from orbit, repair and subsequent reinsertion to orbit. In some cases the satellites themselves can contain explosive fuel of either solid or liquid nature. It may be difficult or impossible for astronauts to demount fuel tanks from inactive satellites; thus the fuel can represent a sufficient hazard to space shuttle personnel and equipment that recovery of valuable satellites can be unwarranted. It is desirable, therefore, to provide means for recovering inactive satellites and returning them to safe landing on Earth without constituting any hazard to astronauts or other personnel employed in the recovery operations. Further, it is also desirable to provide means for acquisition and disposal of undesirable orbiting space debris which can be accomplished at minimal expense.

As will be discussed in detail hereinbelow, there are basically five types of space debris recovery vehicles presented in this specification which have the capability to retrieve inactive satellites and other valuable space debris. Four of the five classic space vehicles were published at the AIAA/ASME Fifth Joint Thermophysics and Heat Transfer Conference, held in Seattle, Wash., during Jun. 18-20, 1990. The inventor was one of the authors. The configuration of the vehicles were slightly modified in order to retrieve the inactive satellites and safely land them on the Earth's surface. Prediction of the aerodynamic heating values of each type of space debris recovery vehicle is very important and will be based on the vehicle entry trajectory and the physical and chemical properties of thermal protection tiles. Basically, debris recovery vehicles will be provided which may be placed in Earth orbit in the same manner as the space debris vehicles mentioned above. These vehicles will have the capability of maneuvering to intercept and establish protective containment with valuable space debris such as inactive satellites. These recovery vehicles, after being deorbited by retrothrusters, will reenter the Earth's atmosphere and fly to safe landing while being protected from the heat of re-entry by means of thermal protective tiles, and by the geometry of the recovery vehicle design.

SUMMARY OF THE INVENTION

It is a principle feature of the present invention to provide a novel method and apparatus for locating, capturing, and removal of orbiting space debris from orbital areas of interest to thus permit subsequent orbital space activities to be conducted in a safe environment.

It is also a feature of the present invention to provide a novel method and apparatus for capturing orbital space debris and employing heat developed by the kinetic energy of entry of the space debris into the Earth's atmosphere for efficient, low cost disposal of space debris.

It is an even further feature of this invention to provide a novel method and apparatus for cleaning of the orbital space environment which enables valuable space debris such as inactive satellites to be efficiently recovered from orbit for repair, subsequent reuse or analysis for future improvement of satellite design.

It is another feature of this invention to provide a novel method and apparatus for cleaning of the orbital space environment wherein unmanned spacecraft provided with thermal protection systems are employed for deorbiting captured valuable space debris and delivering it to a designated landing site on the Earth's surface.

It is an even further feature of this invention to provide a novel method and apparatus for collecting and disposing of unneeded orbiting space debris which utilizes a space debris capture subsystem having an internal receptacle for collected space debris and which capture subsystem is powered and maneuvered by a separable power subsystem.

It is another feature of this invention to provide a novel method and apparatus for cleaning of the orbital space environment in which a debris collection container of large volume is employed to receive multiple debris receptacles from one or more space debris capture subsystems and wherein the power subsystem of a space debris vehicle is employed to provide power for deorbiting the large space debris collection container after it has been filled, for kinetic energy destruction of the space debris container and receptacles along with the space debris contained therein.

It is another feature of this invention to provide a novel method and apparatus for elimination of space debris from an orbital area of interest which employs solar energy for destruction of space debris that has been captured.

It is a further feature of this invention to provide a novel method and apparatus for elimination of space debris from an orbital area of interest which employs laser energy for destruction of captured space debris.

It is a further feature of this invention to provide a novel method and apparatus for elimination of space debris from an orbital area of interest wherein captured space debris is maneuvered to a debris parking orbit that poses no danger to ongoing space activities or is ejected from Earth orbit to a solar orbit that poses no danger to interplanetary space travel.

It is an even further feature of this invention to provide a novel method and apparatus for eliminating the danger of orbiting space debris from the generated region prior to its extensive propagation to regions of high density space activities.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is a block diagram illustrating differing space debris handling procedures eliminating orbiting space debris from orbital tracks that are designated for orbital space vehicle travel.

FIG. 2 is a schematic illustration in cross-section showing a space debris capture vehicle that is constructed in accordance with the present invention.

FIG. 3 is a block diagram schematic illustration of a space debris vehicle showing the various subsystems that are incorporated therewith.

FIG. 4a is a pictorial illustration of a space debris capture vehicle.

FIG. 4b is a pictorial illustration showing the space debris capture vehicle of FIG. 4a in debris consolidating relation with a space debris container for discharging collected debris therein.

FIG. 4c is a pictorial illustration showing separation of the power and propulsion module from its debris receptacle.

FIG. 4d is a further pictorial illustration showing the power subsystem of FIG. 4c located in powering maneuvering connection with the space debris container of FIG. 4b.

FIG. 4e is a further pictorial illustration showing the space debris container and the power subsystem disposed in re-entry attitude for kinetic energy induced heating and destruction thereof.

FIG. 4f is a pictorial representation similar to FIG. 4e but showing separation of the power subsystem from the debris container.

FIG. 4g is a pictorial representation illustrating maneuvering of the power subsystem to an orbital zone for subsequent reuse.

FIG. 4h is a pictorial representation illustrating the powerless debris container during re-entry.

FIG. 4i is a diagrammatic illustration showing the Earth, Earth atmosphere, and normal orbit of the space debris, together with the points of deorbiting and kinetic energy destruction of the space debris.

Figure 1:
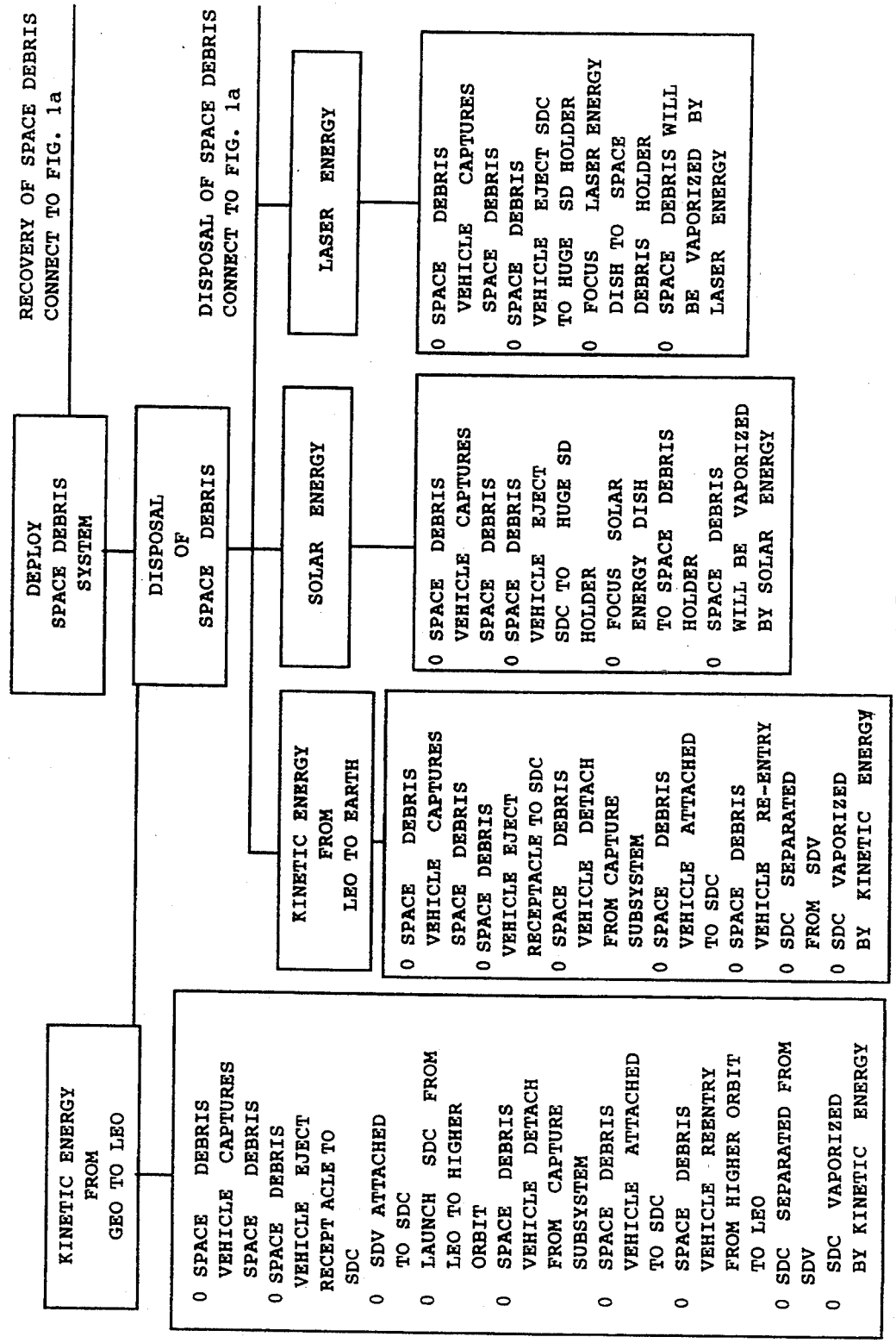
Figure 1A:
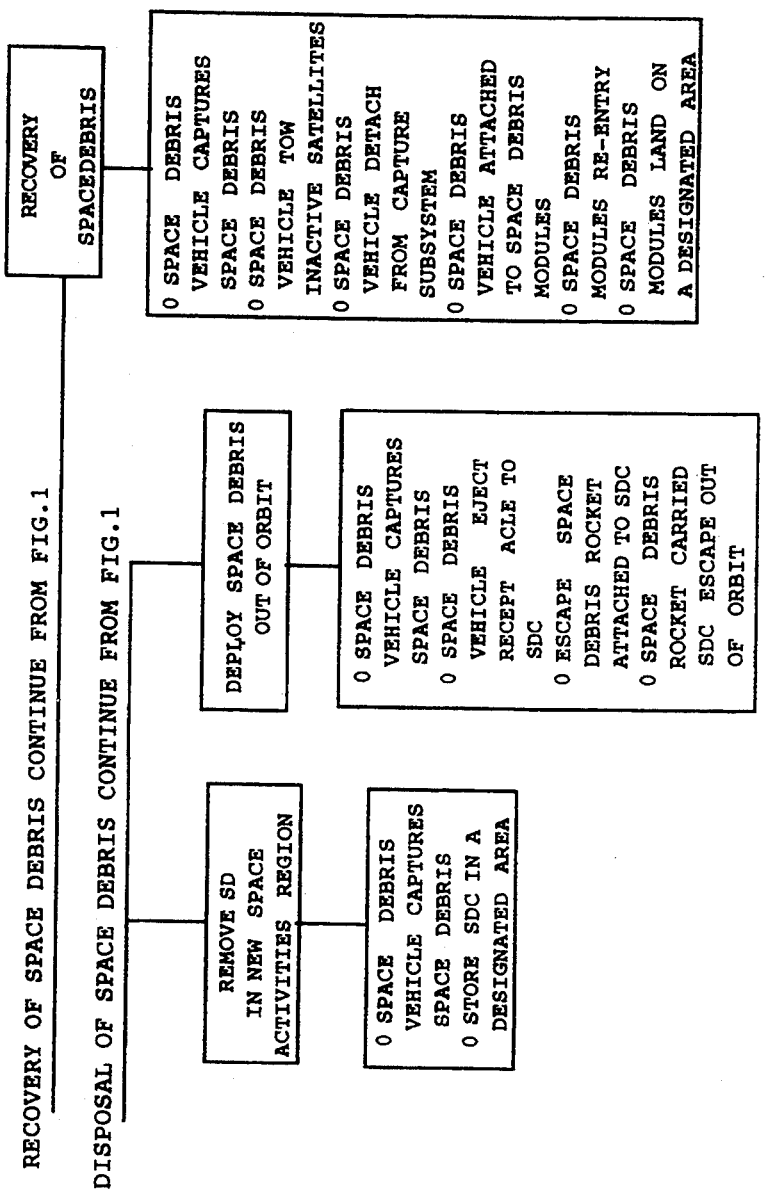

FIG. 5a-1 is a schematic pictorial representation similar to FIG. 4a and showing space debris being contained therein.

Figure 2:
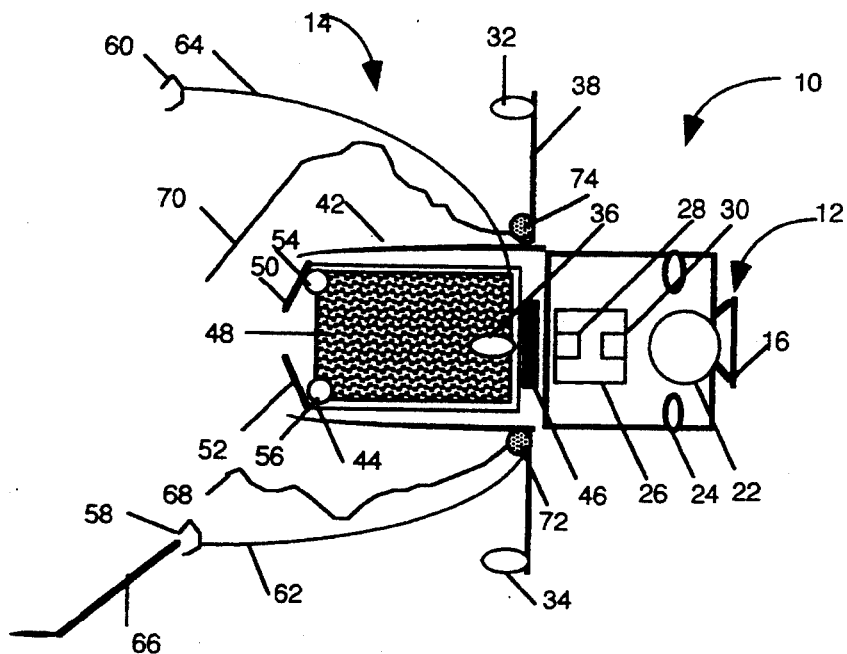

FIG. 5a-2 is a further pictorial representation showing the space debris vehicle of FIG. 5a-1 being employed for towing space debris of sufficient size that it can not be contained within the receptacle of the vehicle.

FIG. 5b-1 is a pictorial representation disclosing loading of a Apollo shaped recovery vehicle with space debris from the vehicle shown in FIG. 5a-1.

FIG. 5b-2 is a further pictorial representation disclosing loading of a Apollo shaped space debris recovery vehicle with a large object such as a non functioning satellite for deorbiting and recovery.

FIG. 5c is a pictorial representation similar or identical to that of FIG. 4a, showing separation of the power subsystem from the collection receptacle.

FIG. 5d is a pictorial representation illustrating assembly of the power subsystem of FIG. 5c to the recovery vehicle of FIGS. 5b-1 or 5b-1.

FIG. 5e is a pictorial representation showing the powered vehicle of FIG. 5d in re-entry attitude.

FIG. 5f is a pictorial representation similar to that of FIG. 4f which illustrates deorbiting and recovery of the debris containing vehicle shown in FIG. 5e.

FIGS. 6a-1–6f are pictorial representations similar to those of FIGS. 5a-1–5f which illustrate the sequences of capturing small or large space debris and bringing it to Earth recovery via an AFE type recovery vehicle of appropriate configuration for efficient re-entry to safe Earth landing.

Figures 1, 7A:
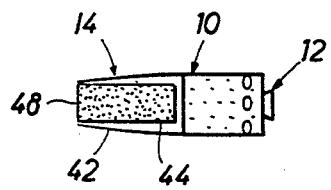
Figures 2, 7A:
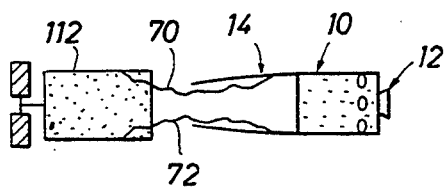
Figures 1, 7B:
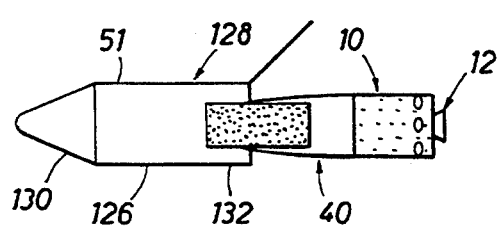
Figures 2, 7B:
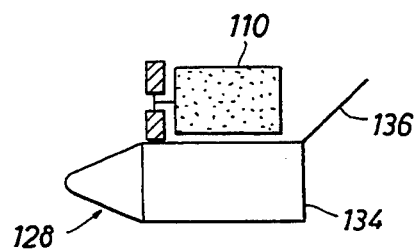
Figure 7C:
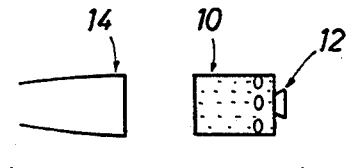
Figure 7D:
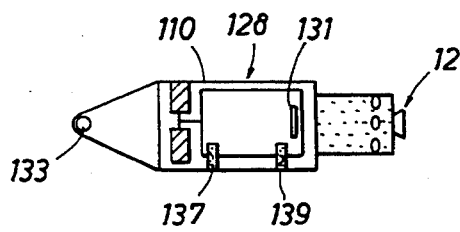
Figure 7E:
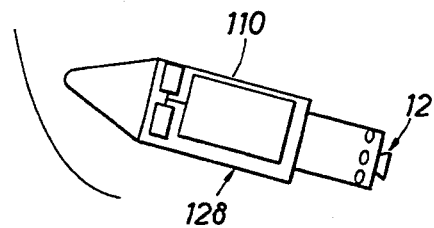
Figure 7F:
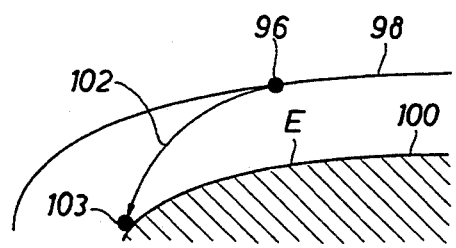

FIGS. 7a-1–7f are further pictorial representations illustrating sequential acquisition of large or small space debris and flying the same to safe Earth landing for recovery, with deorbiting being accomplished by the power and thruster system of the space debris collection vehicle.

FIGS. 8a-1–8f are further pictorial representations illustrating sequential acquisition deorbiting and recovery of large or small space debris through the use of a mushroom-shaped re-entry vehicle utilizing the power and thruster system of the debris collection vehicle.

FIGS. 9a-1–9f are also pictorial representations illustrating a space debris recovery sequence for large and small space debris utilizing a bullet-shaped recovery vehicle powered by the power subsystem of the debris recovery vehicle.

FIGS. 10a–10f are pictorial representations of a space debris capture and handling system for boosting captured space debris to a high earth orbit that does not interfere with normal launching and orbiting activities.

Figures 10A, 10B:
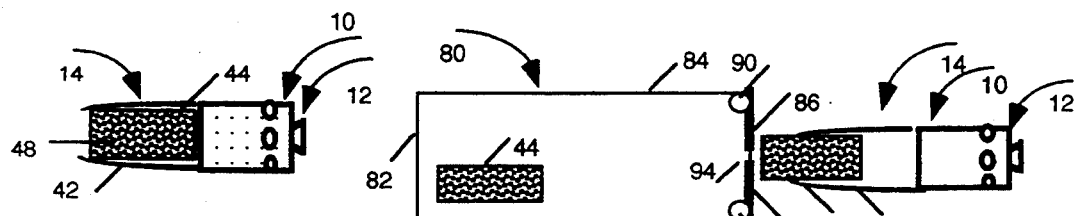
Figures 10C, 10D:
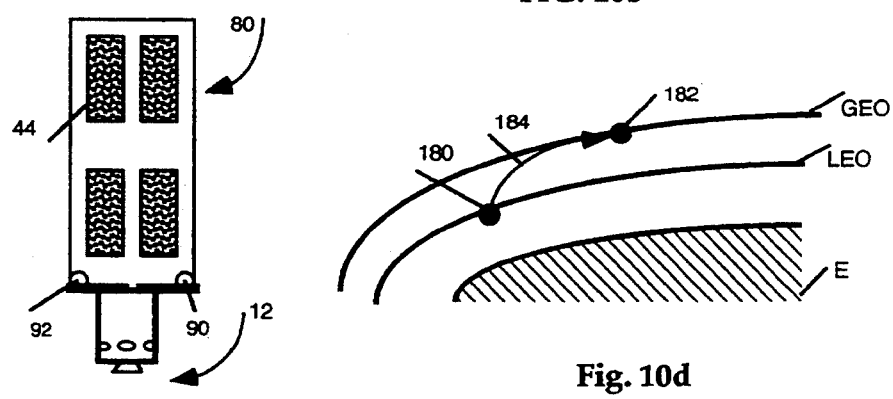

FIGS. 10g–10k are pictorial representations showing subsequent destruction of captured space debris from low Earth orbit after movement thereof from the high earth orbit of FIG. 10d.

Figure 11A:
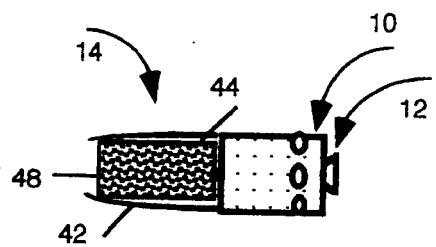

FIG. 11a is a view in partial section similar to that of FIG. 10a-1 and showing a space debris vehicle with a receptacle therein filled with space debris.

Figure 11B:
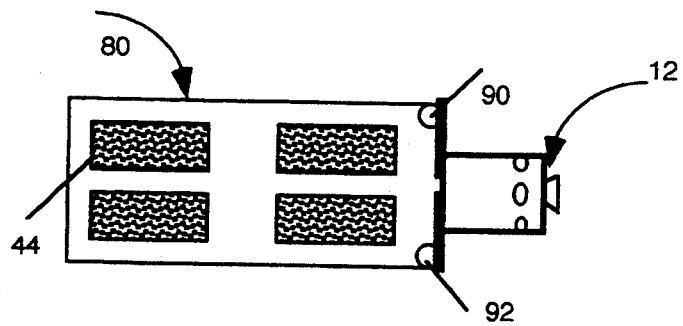

FIG. 11b is a pictorial representation of a space debris container for containing a number of space debris receptacles and closing the same for subsequent disposal.

Figure 11C:
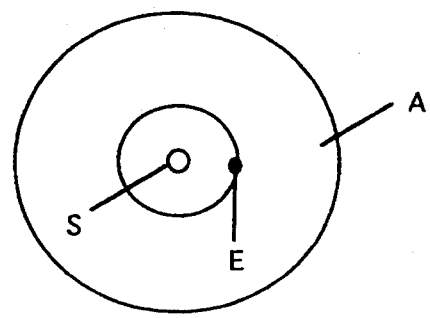
Figure 11D:
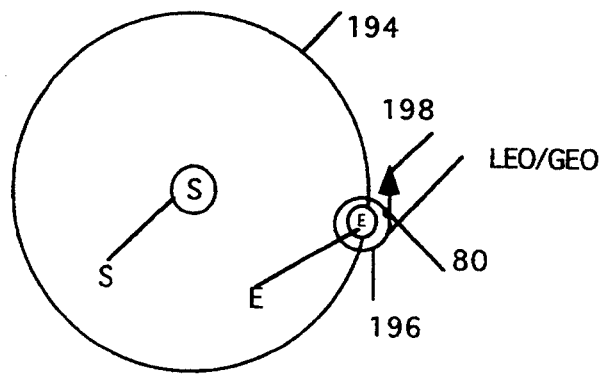

FIGS. 11c and 11d are pictorial representations illustrating ejection of space debris from Earth orbit.

FIGS. 12a–12f are pictorial representations of a solar energy space debris disposal system for utilizing solar energy to destroy the space debris container of FIG. 11b together with its collection of filled space debris receptacles.

Figure 12A:
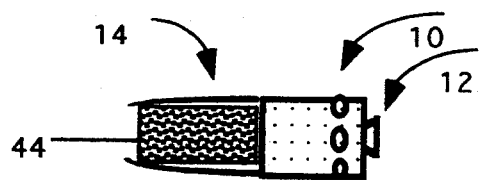
Figure 12B:
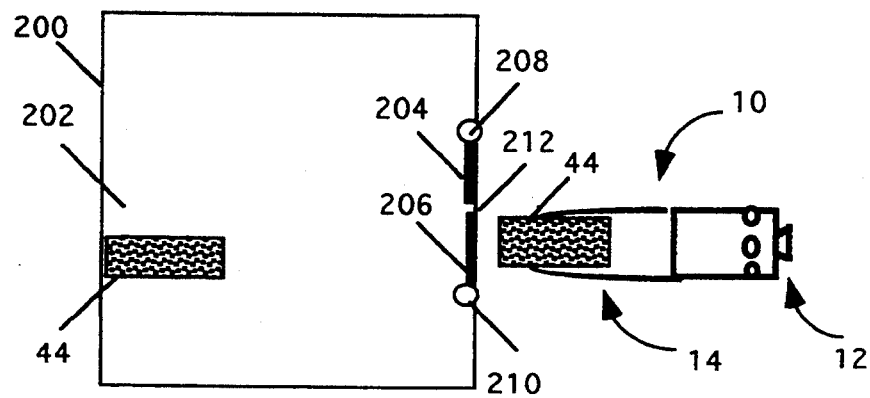

FIG. 12b is a pictorial representation of a space debris vehicle having a filled space debris receptacle therein.

Figure 12C:
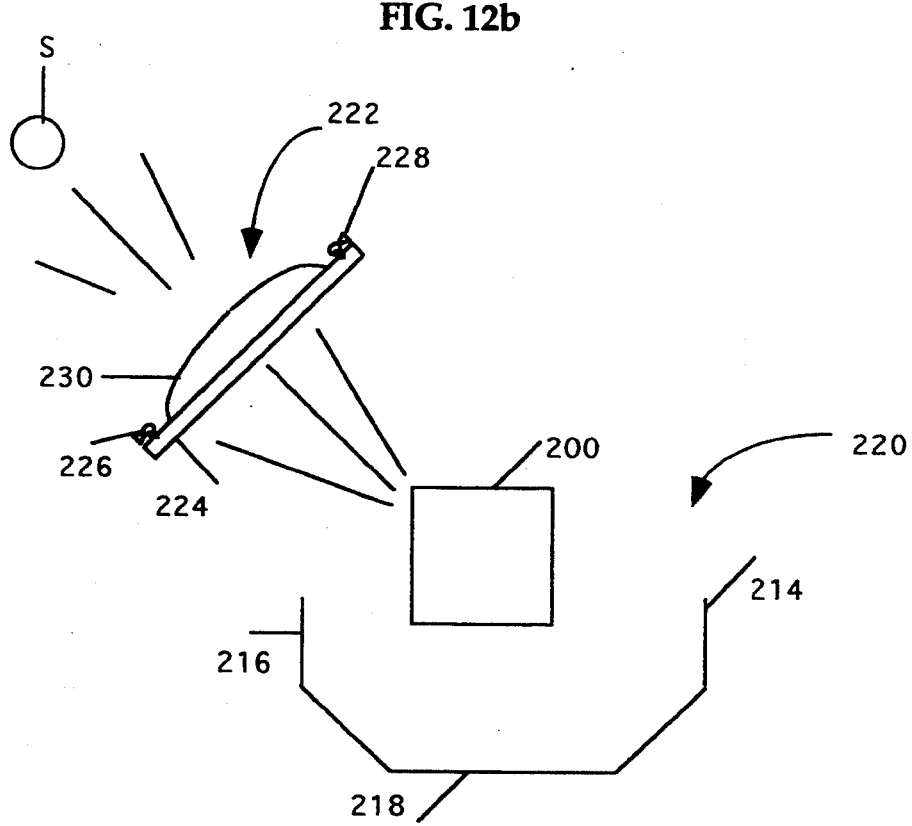

FIG. 12c is a pictorial representation of a huge space debris container shown to be containing a filled space debris receptacle and receiving a second filled space debris receptacle from a space debris vehicle.

Figure 12D:
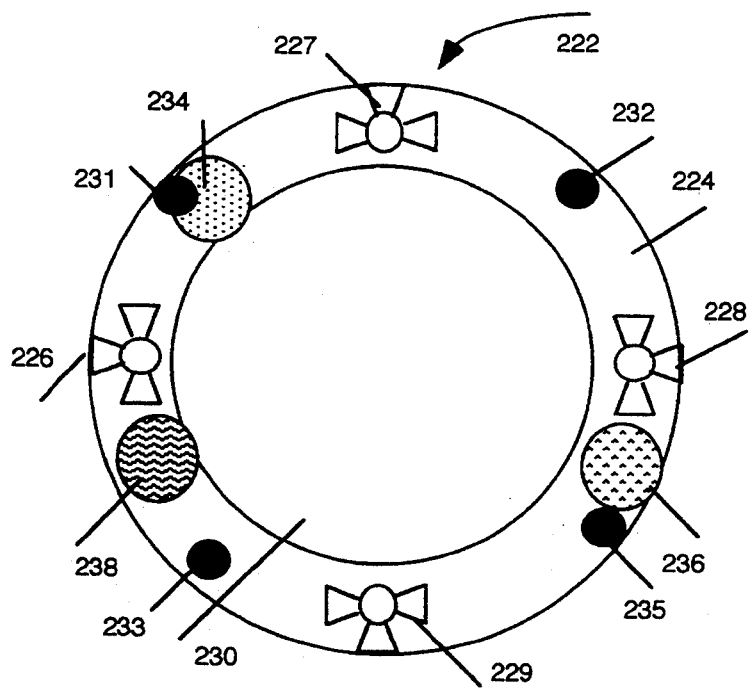

FIG. 12d is a plan view of a solar lens and lens control system for use in the manner shown in FIG. 12c for solar energy destruction of space debris.

Figure 12E:
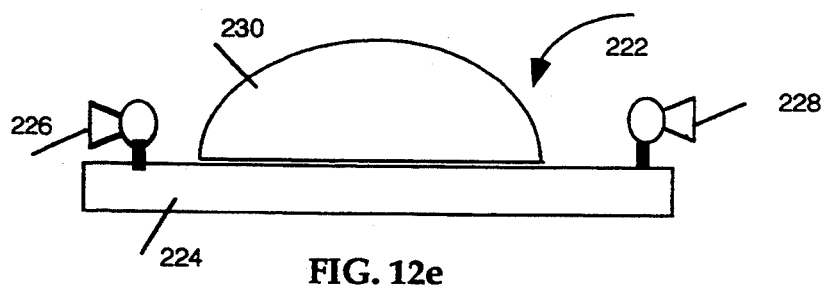

FIG. 12e is an elevational view of the solar lens and lens control system of FIG. 12d.

Figure 12F:
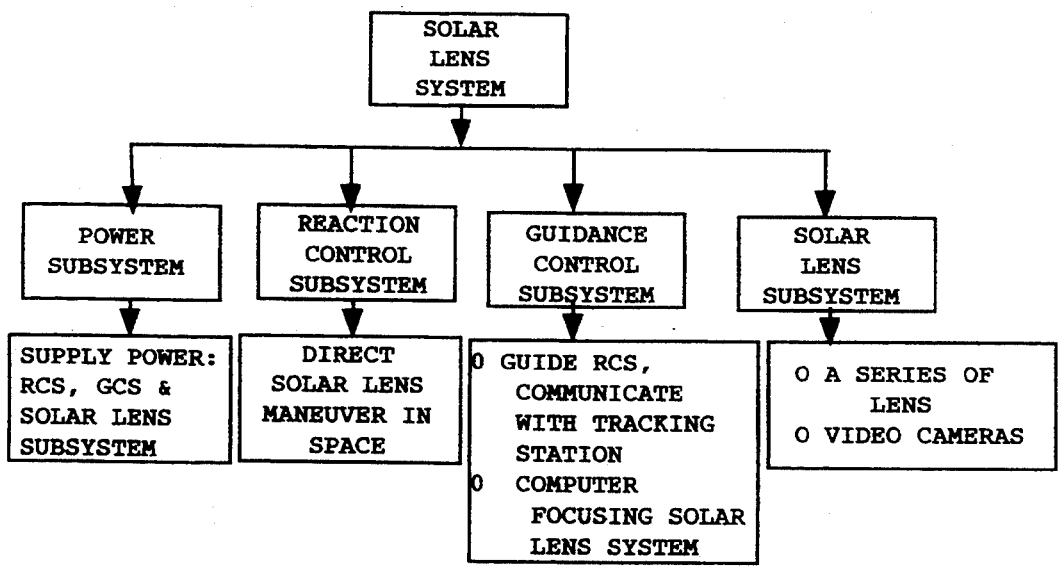

FIG. 12f is a block diagram representation of the control system for the solar lens and lens control system of FIGS. 12d and 12e.

Figure 13A:
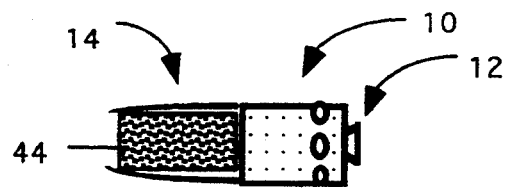
Figure 13B:
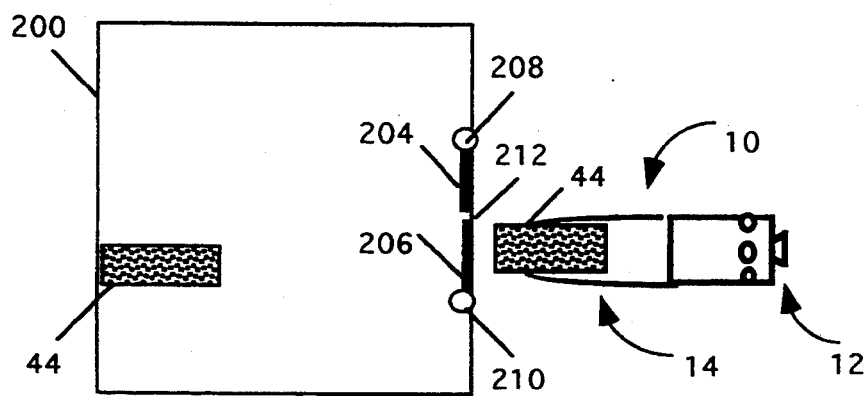

FIGS. 13a and 13b are pictorial representations of space debris capture and collection by a space debris vehicle and a huge space debris container.

Figure 13C:
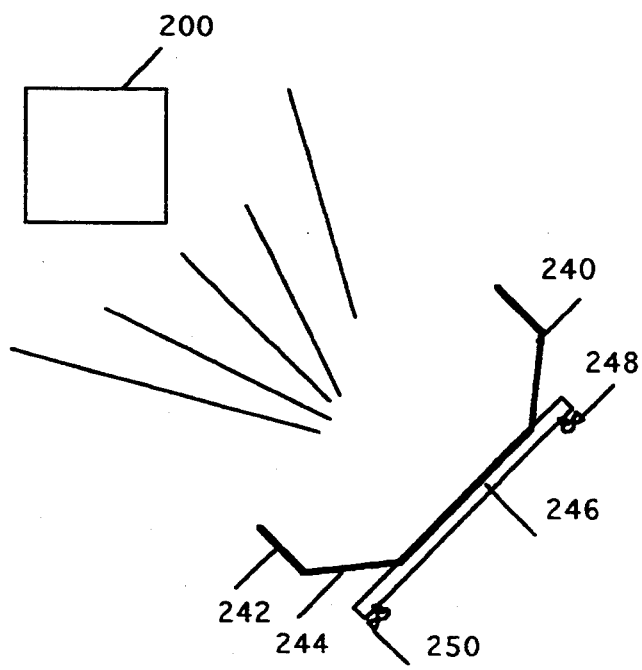

FIG. 13c is a pictorial representation showing destruction of a huge container of space debris by laser energy being controlled by a laser energy generation system.

Figure 14A:
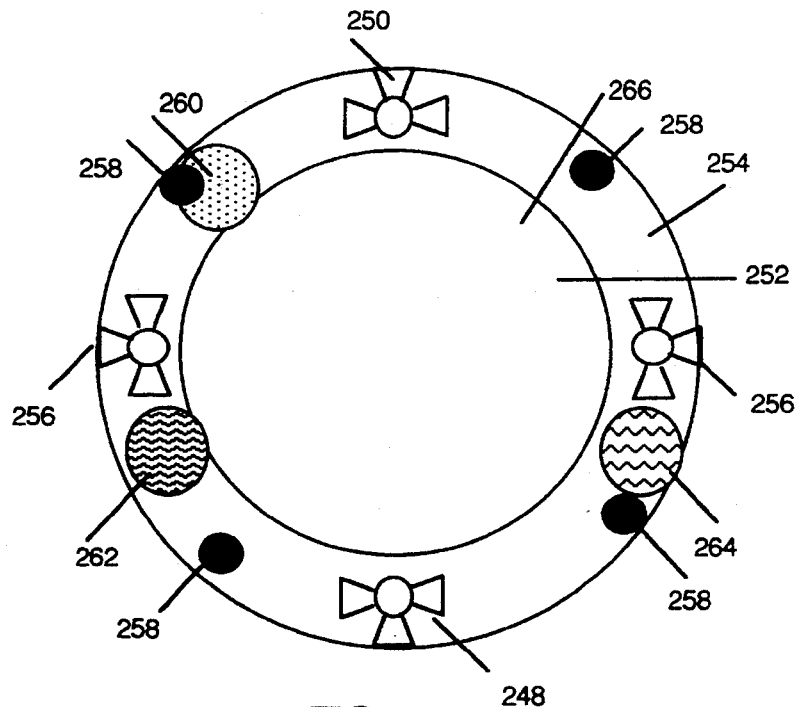

FIG. 14a is a plan view of a laser and laser control system for laser energized destruction of space debris.

Figure 14B:
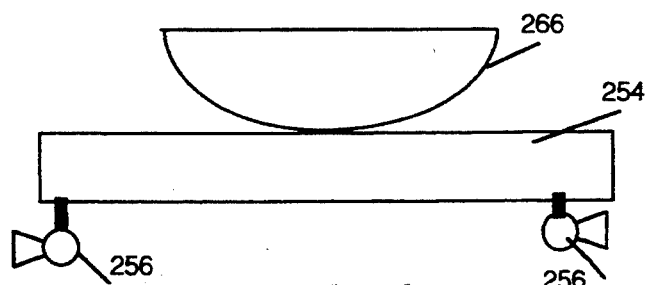

FIG. 14b is a side elevational view of the laser and laser control system of FIG. 14a.

Figure 14C:
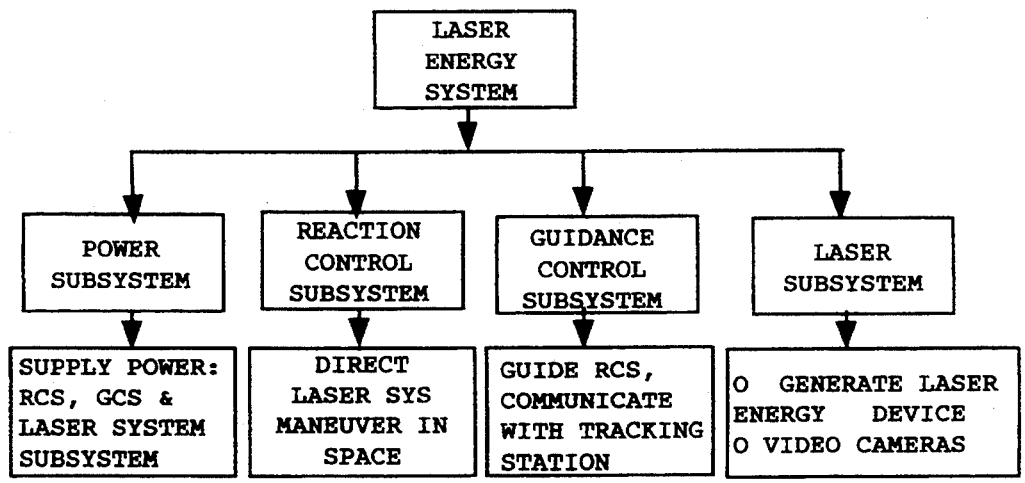

FIG. 14c is a block diagram illustration of the laser control system for the apparatus of FIGS. 14a and 14b.

DETAILED DESCRIPTION OF PREFERRED EMBODIMENT

Referring now to the drawings and first to FIG. 1, the present invention can be categorized into two general procedures: (1) disposal of non-valuable space debris and (2) recovery of inactive satellites and other valuable space debris. As shown by way of the block diagram illustration, the method or process of deploying in Earth orbit a system for capture of orbiting space debris and then either disposing of it or deorbiting it and transporting it to the Earth's surface. Space debris recovery is accomplished by a protective space vehicle designed for such purpose to thus enable the space debris, which in this case will have considerable value, to be repaired and otherwise restored for reuse, salvage, or scientific analysis. FIG. 1 illustrates five differing systems for elimination of space debris from active orbital zones. The specific methods for recovering valuable space debris or disposing of space debris will be discussed in detail hereinbelow.

SPACE DEBRIS CAPTURE VEHICLE

Figure 3:
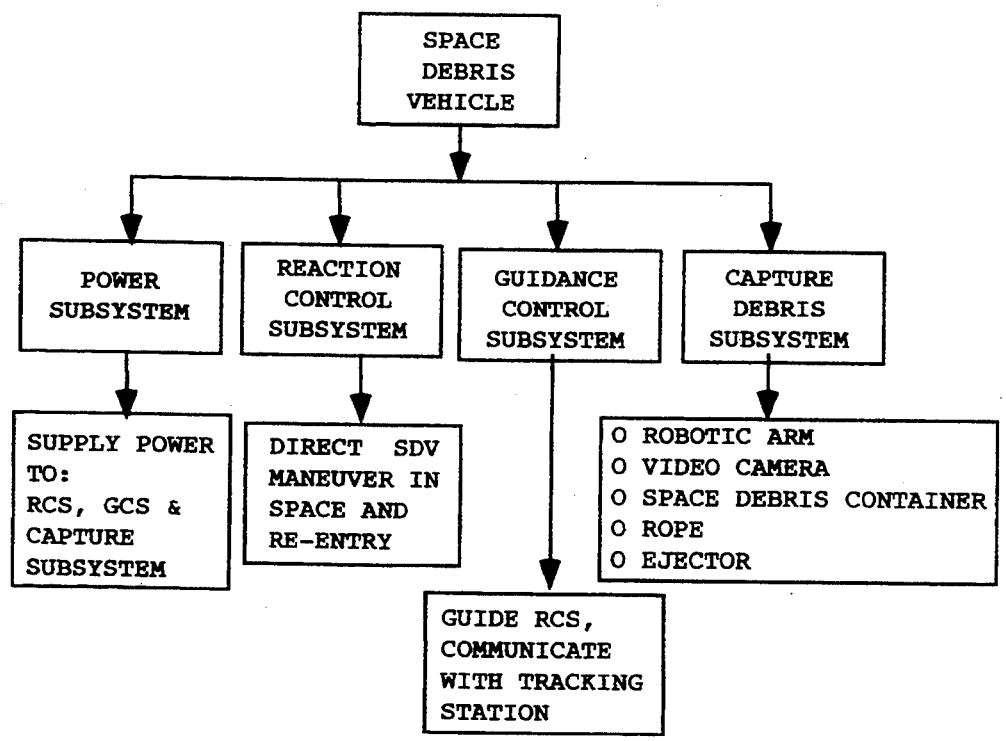

Referring now to FIGS. 2 and 3, there is shown by way of partially graphical and partially schematic illustration a space debris vehicle (SDV) shown generally at 10 which includes a power subsystem illustrated generally at 12 and a debris capture subsystem shown generally at 14. The power subsystem 12 is releasably coupled to the debris capture subsystem 14 and incorporates a rocket engine 16 for primary motive thrust from power source 22. The power subsystem 12 is also provided with a reaction control subsystem 24 in the form of a plurality of directional control thrusters together with the respective selective control systems therefor. The power subsystem 12 is also provided with a guidance and control subsystem 26 having on-board computers 28 and 30 which function as primary and backup computer control for the primary and reaction control thrusters for motive power and maneuvering of the vehicle. The computers 28 and 30 also provide computerized control for a computerized video control system incorporating a plurality of video cameras, i.e., four cameras, such as shown at 32, 34 and 36 which are provided to view the space debris as the vehicle approaches it and thus provide remotely located personnel with the capability of guiding vehicle movement via computer control so as to bring the vehicle into recovering relation with the space debris. Typically, the video cameras will be located at the ends of extenders 38 to provide for efficient, differential angle viewing of the debris as it is approached and contained. The video cameras will provide differential angle signals which can be processed remotely following telemetry to thus provide computed date for use in maneuvering the SDV to the debris.

The debris capture subsystem 14 incorporates a generally cylindrical casing or housing 42 which is adapted to releasably contain a debris receptacle 44. A thruster system 46 is provided within the casing 42 or in assembly with the debris receptacle 44 and serves to eject the debris receptacle from the casing 42 as desired. The debris receptacle 44 defines a receptacle opening 48 which is controlled by means of space debris dampers 50 and 52 that are in turn controlled by damper sensors 54 and 56. The purpose of the dampers and damper control sensors is to provide for retention of the space debris after it has entered the receptacle 44. Otherwise, in the absence of gravity as exists in Earth orbit, if not retained, the space debris would simply leave the receptacle 44 and float free of the vehicle.

In many cases, the space debris being acquired by the space debris vehicle will not readily enter the access opening 48 of the space debris receptacle. In such case, it must be grasped in some manner and forced to enter the receptacle. In accordance with the present invention, space debris may be grasped by gripper elements 58 and 60 of robotic arms 62 and 64. After space debris has been grasped by the gripping elements 58 or 60, it may be maneuvered by the robotic arms 62 or 64 through computer control utilizing the video cameras 32-36 for differential angle visualization of the debris handling and capture procedure. In some cases, space debris may be sufficiently small that it cannot be readily grasped by the gripper elements of the robotic arms. In such cases the debris capture vehicle 10 is provided with one or more space sweepers 66 which may be maneuvered by the grappling hands 58 and 60 of the robotic arms 62 and 64 so as to direct even the smallest particles of space debris through the access opening 48 and into the debris receptacle 44.

In many cases, such as in the case of inactive satellites, the space debris will be of sufficiently large dimension that it can not enter through the access opening 48 and thus can not be captured within the debris receptacle 44. In such case, it is desirable that the space debris vehicle be capable of attachment to the space debris and capable of utilizing its thrusters 16 or 24 for maneuvering the space debris to a desirable safe location such as a parking orbit well away from a regularly traveled orbital zone. To accomplish this feature, the space debris vehicle 10 is provided with one or more attachment devices such as shown at 68 and 70, which may be in the form of cable or rope tethers which are normally wound about storage reels 72 and 74 respectively. The tethering ropes or cables 68 and 70 may be appropriately deployed by the cable reels 72 and 74 and may be manipulated by the grappling hands 58 and 60 of the robotic arms for secure attachment to the space debris. The reaction and guidance control subsystems may then be activated for towing or pushing the space debris from a potentially dangerous location to a safer location where it may be parked in a safe orbit and scheduled for subsequent disposal or recovery. The laser beam will be used to cut large space debris into suitable sizes for entry into debris receptacles 44.

KINETIC ENERGY DESTRUCTION OF SPACE DEBRIS

Referring now to the block diagram illustration of the space debris vehicle and its subsystems and operational components and to FIGS. 4a-4f, a sequence of space debris acquisition and disposal is presented. FIG. 4a is a pictorial or schematic illustration of the space debris vehicle 10 having a debris receptacle 44 removably contained therein. As shown in FIG. 4b, there is provided a large space debris containment and disposal vessel shown generally at 80 and described herein as a space debris container. The container 80 includes closed end and side walls 82 and 84 and incorporates damper closures 86 and 88 that are movably connected to the side walls and selectively opened by damper sensors 90 and 92 respectively. The large space debris container 80 is shown to contain a small space debris receptacle 44 and to be receiving a space debris receptacle 44 from the casing 42 of the capture subsystem 14. For placement of the receptacle 44 within the large container 80, the dampers 86 and 88 are opened by their respective sensors with the vehicle 10 close to and in alignment with the entry opening 94 of the receptacle. The ejector 46 of the vehicle 10 then may be activated such as by computer control to eject the receptacle 44 with its collection of debris from the internal chamber of the casing 42 through the entry opening 94. After this has been done, the dampers 86 and 88 will be closed in order to retain a number of debris filled receptacles 44 therein such as in the manner shown in FIG. 4d. After the large collection container 80 has been completely filled with the smaller debris receptacles 44 in the manner shown in FIG. 4d, the power subsystem 12 is decoupled from the debris capture subsystem 14 and the power subsystem is then coupled in powering and maneuvering relation with the large space debris container 80 in the manner shown in FIG. 4d. Then, through computerized control of the guidance and control thrusters of the power subsystem 12, the assembly of FIG. 4d will then be oriented for deorbiting rocket firing which occurs as shown at point 96 on the orbital path 98, in FIG. 4f. As shown in FIG. 4e, the assembly of the power subsystem 12 and the large space debris container 80 is oriented by the guidance and control thrusters for re-entry into the Earth's atmosphere upon command from a ground tracking station or any other suitable tracking and control facility. The container 80 will begin its entry into the atmosphere after which the power subsystem will be separated from the debris container and the power subsystem, under control from a tracking station will be directed to change course to an appropriate orbit for reuse. The debris container 80, being slowed by the atmosphere, will continue an entry trajectory during which it is destroyed the heat of kinetic energy. A prerecorded space debris vehicle entry program is stored in the guidance and control subsystem, thus causing the space debris vehicle to achieve a desired trajectory during deorbiting flight. As shown in FIG. 4f initiation of spacecraft reentry from low Earth orbit will be in the order of 400,000 feet above the surface 100 of the Earth. In fact, reentry programs are typically designed for initiation at an altitude of 400,000 feet. The space debris vehicle follows a preprogrammed instruction and maneuvers toward an Earth region of low population density, such as the Indian Ocean for example, thus flying on an entry trajectory 102 toward the Earth's surface. Typically, after the vehicle has descended approximately 100,000 feet as indicated by point 104 of FIG. 4f, on its re-entry trajectory, the entirety of the space debris container 80 will have been heated to the point of melting and vaporization.

RECOVERY OF VALUABLE SPACE DEBRIS

Generally speaking, space debris recovery vehicles will contain three basic subsystems including a thermal protection subsystem, a thermal control subsystem, and an auxiliary power supply subsystem (APU, auxiliary power unit). In order to increase the storage volume of the RSV, its reaction control and guidance control subsystems will be substituted by the power subsystem of the space debris vehicle. The thermal protection subsystem may utilize any one of several types of thermal protection insulation materials including a high temperature resistance insulation system, a reinforcing carbon carbon (RCC) or advanced carbon carbon (ACC) system. It is very important to predict the vehicle aerodynamic heating during re-entry which is based upon the surface catalicity of the vehicle (thermal protection tile surface including its physical and chemical properties), entry trajectory, shape of the vehicle and various other factors. The particular shape of the reentry vehicle is controlled to a large extent by the weight and volume of the space debris that is being recovered. Obviously if the recovery vehicle is of inadequate design it can be destroyed or seriously damaged during its re-entry flight or it can be sufficiently heated that the valuable space debris cargo may be subjected to deterioration by excessive heat.

With regard to the thermal control subsystem, the internal temperature of the space debris recovery vehicle can reach from 100-200° F. or higher even if the vehicle is provided with proper thermal protection tiles. When a inactive satellite is being recovered for restoration it will be important to maintain its internal temperature within a 75° to 80° F. range in order that the electronic system or the valuable real time data recorder of the satellite can be recovered in sufficiently operative condition for recovery of its valuable recording data.

The auxiliary power supply system which is provided by the power subsystem will be designed to maintain the thermal-control system of the recovery vehicle in a condition of proper function. Thus, additional power will be required. The power subsystem of the space debris vehicle can supply power to the thermal control subsystem of the recovery vehicle.

From the standpoint of kinetic energy disposal, the space debris will be handled in accordance with FIGS. 5a–5f as discussed above. Small receptacles of collected space debris will be deposited in large space debris containers as shown at 80 in FIG. 5b. The power subsystem will then be separated from the debris collection module as shown in FIG. 5c and will be assembled to the large space debris container as shown in FIG. 5d. Space debris container re-entry will then occur causing the space debris to be burned to the point of melting and vaporization by the heat developed as the result of the kinetic energy of vehicle re-entry.

In the event it is desirable to recover space debris because of its value or importance, as shown in FIGS. 5a-2 and 5b-2, the sequence of operations will be accomplished as shown at the right hand portion of the drawings. As shown in FIG. 5b-2, a space debris vehicle having thermal protection to permit its reentry will be loaded with valuable space debris such as an inactive satellite or any other debris having sufficient value for recovery. The power subsystem 12 of the space debris vehicle 10 will then be detached from its debris capture subsystem 14 and will be assembled to the debris recovery vehicle 106 or 114. The thrusters of the power subsystem are then fired with the debris recovery vehicle appropriately oriented for orbit degradation and re-entry. As shown in FIG. 5e, the recovery vehicle will then fly a predetermined re-entry trajectory for landing on a designated area at the Earth's surface or for soft touchdown at a predetermined landing site. Typically, vehicle recovery will not be accomplished by water landing because the heat insulating tiles of the vehicle will not typically resist damage upon water impact.

APOLLO TYPE RECOVERY VEHICLE

The space debris recovery procedure illustrated at the right hand portion of the block diagram schematic in FIG. 1 is depicted pictorially in FIGS. 5a-1–5f. As shown in FIG. 5a-1, the assembly of the power subsystem 12 and the debris capture subassembly 14 is shown to be provided for containing small space debris in an internal debris receptacle 44 in the manner described above in connection with FIG. 4a. Since the space debris will be destined for recovery, even though it may be in the form of multiple small fragments, its receptacle 44 is ejected from the housing 42 of the debris capture subassembly by operation of the ejector 46 shown in FIG. 2. For the purpose of recovery, re-entry of space debris through the Earth's atmosphere will be accomplished by a recovery capsule 106 and APU 113, 115 of the Apollo variety having a frusto-conical upper portion 108 and a launch, rounded reentry surface 110 which may be covered with thermal protection tiles.

As shown in FIG. 6c the power subsystem will be separated from the debris capture subsystem 14 and the power subsystem will be suitably docked and locked to the small upper extremity of the recovery capsule 106 in the manner shown in FIG. 5d. The power subsystem will then be employed to orient the recovery capsule 106 for re-entry such as is shown in FIG. 5e. In the re-entry diagram of FIG. 5f, for low Earth orbit, the vehicle entry trajectory will be in the order of 400,000 feet above the Earth's surface 100 at the point of reentry initiation as determined by the entry program. Thus, retro-firing of the power subsystem is initiated to ascent at point 96 on the lower orbit 98 and capsule descent follows a predetermined re-entry trajectory 102 to soft landing on the Earth's surface at the designated landing site 103 with the landing system 117, 199 and parachute 111.

As shown in FIG. 5a-2 the space debris 112 is shown to be in the form of an inactive satellite. For its recovery it will be towed or pushed by the space debris vehicle 10 until it is brought into close proximity to the recovery capsule 114. This recovery capsule is also of the Apollo type design but defines a large side entry opening that is closed by means of a closure hatch 116. After the satellite 112 has been placed within the capsule and secured, the hatch 116 is closed and locked. Thereafter, the re-entry and recovery procedure occurs in the manner as discussed above in connection with FIGS. 5c–5f.

AEROASSIST FLIGHT EXPERIMENT TYPE RECOVERY VEHICLE

FIGS. 6a-1 through 6f illustrate the sequence of capture and recovery of both large and small space debris and providing re-entry for recovery by means of a re-entry vehicle constructed in accordance with the Aeroassist Flight Experiment Heating-Rate Sensitivity Study, (AFE) *JOURNAL OF THERMOPHYSICS AND HEAT TRANSFER*, Vol. 5, No. 4, Oct.–Dec. 1991, Pages 56–462. As shown in FIG. 6a-1, the debris recovery vehicle will be of the character shown and described in connection with FIG. 4A. The internal debris receptacle 44 will receive space debris of sufficiently small size that it will pass through the entry opening 48 and enter the internal debris receptacle. If the debris is large, such as in the case of an inactive satellite shown at 112 in FIG. 6a-2, the towing cables 68 and 70 of the vehicle 10 will be unreeled and appropriately secured to the satellite. The propulsion system of the power subsystem 12 will then be employed to tow the satellite 112 from its position to a location near the AFE recovery vehicle 116 shown in FIGS. 6b-1 and 6b-2. This recovery vehicle is provided with a large, blunt rounded surface 128 which may be an ablative surface or, in the alternative, may be provided with heat insulating tiles to prevent sufficient kinetic heat build-up to destroy the vehicle. The vehicle is also provided with large access hatches 120 and 122 which enable the vehicle to receive large space debris such as the satellite 112. As shown in FIG. 6b-1 the receptacle 44 of small space debris will be jettisoned from the vehicle 10 into the cargo hold 124 of the recovery vehicle. The cargo hold 124 may be designed to receive several of the space debris containers 44 prior to its re-entry for recovery.

After the cargo hatches 120 and 122 have been closed and secured with the space debris contained within the cargo hold 124 the power subsystem 12 will be separated from the space debris capture module 14 thereby enabling the power subsystem to be employed in operative assembly with the AFE recovery vehicle 116 and APU 123, 125 as shown in FIG. 6d. With the space debris recovery vehicle properly oriented, the power subsystem is activated to provide deorbiting thrust at a predetermined point 96 of the Earth's orbit 98 as shown in FIG. 6f. Thereafter, the recovery vehicle begins its descent through the Earth's atmosphere following a trajectory 102 with the space debris cargo being protected during re-entry by the configuration and construction of the recovery vehicle 116. Touchdown at the Earth's surface at designated landing site 103 occurs by means of any suitable landing system such as a runway landing system 127, 129, descent parachute 121, etc.

BICONIC TYPE RECOVERY VEHICLE

With reference now to FIGS. 7a-1 through 7f there is disclosed a space debris recovery system utilizing a recovery vehicle of biconic configuration which is adapted to receive for re-entry and recovery both large and small space debris of sufficient value for restoration, re-use or study. FIGS. 7a-1 and 7a-2 illustrate the collection of both large and small space debris in similar manner as discussed above in connection with FIGS. 2, 6a-1 and 6a-2. As shown in FIG. 7b-1, small space debris is being jettisoned from the space debris vehicle 10 into the cargo bay 126 of a biconic type recovery vehicle shown generally at 128 and incorporating different conical sections 130 and 132. As shown in FIG. 7b-2 the recovery vehicle 128 is provided with an access opening 134 which is closed and secured by a cargo hatch 136. The cargo hatch and/or the rear end of the vehicle 128 will be suitably designed for mounting of the power subsystem 12 in the manner shown in FIG. 7d. The recovery vehicle may also incorporate an auxiliary power supply system or unit (APU) 133 for controlling the internal temperature of the recovery vehicle. After separation of the power subsystem 12 from the debris capture subsystem 14 as shown in Fig. 7c. With the biconic vehicle 128 properly oriented for retrofiring and reentry, the power subsystem 12 will be activated permitting controlled firing of the propulsion thruster and the guidance and control thrusters so as to deorbit the recovery vehicle 128 as shown at point 96 in FIG. 7f, causing it to descend along a designed trajectory 102 to safe landing on the Earth's surface 100 at designated landing site 103. Here again, landing may be achieved by any suitable landing system such as landing gear 137–139 together with parachute 131 to provide adequate protection for the recovery vehicle and its recovered space debris.

MUSHROOM TYPE RECOVERY VEHICLE

As shown in FIGS. 8a-1 through 8f, there is presented a sequence of space debris recovery whether the space debris is small and collected within a receptacle 44 as shown in FIG. 8a-1 or whether the space debris is large as depicted by an inactive satellite 112 as shown in FIG. 8a-2. Recovery of the space debris of FIGS. 8a-1 or 8a-2 is accomplished by means of a recovery vehicle shown generally at 140 being of mushroom-like configuration forming a rounded thermal protective surface 142 having protective tiles thereon for purpose of thermal protection during kinetic energy build-up. The vehicle 40 includes a cylindrical trailing portion 144 having a diameter approximately ½ that of the large leading extremity defined by the rounded end surface 142. The trailing section 144 defines a cargo bay 146 within which space debris receptacles 44 may be stowed after being Jettisoned therein in the manner shown in FIG. 8b-1. The cargo bay is closed by means of a cargo hatch 148 after the cargo by has been appropriately filled with containers of collected space debris. The cargo hatch or the rear end portion of the vehicle 140 will be of appropriate configuration for attachment of the power subsystem 12 thereto. As shown in FIG. 8e following its separation from the debris capture module 14 as shown in FIG. 8c.

In the event the space debris is large and consolidated, such as in the case of an inactive satellite 112, the debris recovery vehicle 140 may be provided with a lateral or side opening through the tubular wall structure 144 of the trailing end portion of the vehicle to thus enable the satellite to be placed therein in the manner shown by the movement arrow of FIG. 8b-2. In this case, the vehicle 140 will be provided with a cargo hatch 150 which is closed as indicated by a movement arrow after the satellite has been properly secured within the cargo bay vehicle. In this case the blunt, rear end portion 152 of the vehicle will be appropriately configured for locking reception of the power subassembly 12 thereto as shown in FIGS. 8d and 8e. Auxiliary power units 143, 145 are provided to control the internal temperature of the recovery vehicle during re-entry. As further shown in FIG. 8e, the vehicle 140 will be appropriately positioned for deorbiting firing of the power and control module 12 as shown at point 96 in FIG. 8f so that the recovery vehicle with its cargo will fly a re-entry trajectory 102 to a safe landing at designated landing site 103 on the Earth's surface utilizing the landing system 147, 149 and descent parachute 141.

DOMED CYLINDER TYPE RECOVERY VEHICLE

Referring now to FIGS. 9a-1 through 9f, there is represented space debris recovery procedures for both small and large space debris. FIG. 9a-1 is representative of orbital space debris collection through utilization of a space debris vehicle of the character shown in FIG. 2. FIG. 9a-2 is representative of towing space debris such as an inactive satellite 112 to a safe location for recovery vehicle loading and subsequent recovery operation. In this case, space debris recovery is shown to be accomplished by a recovery vehicle shown generally at 160 which is in the form of a domed cylinder having a leading end surface 162 of dome shaped configuration which is connected integrally with a cylindrical vehicle body structure 164 defining a cargo bay 166. As shown in FIG. 9b-1 the recovery vehicle 160 is provided with a cargo opening 168 at the trailing end thereof which is closed after vehicle loading by means of a cargo hatch 170. The cargo bay is filled by jettisoning filled space debris receptacles 44 from the space debris capture subassembly 14 of vehicle 10 through the cargo access opening 168.

In the event of large, consolidated cargo, such as the inactive satellite 112, the wall structure 164 of the vehicle body will form a large lateral or side entry cargo access opening 172 permitting lateral entry of the satellite or other cargo therein. After the cargo has been properly secured within the recovery vehicle body structure, a cargo hatch 174 will be pivoted in the direction of the movement arrow so as to close and secure the cargo bay.

After the recovery vehicle 160 has been appropriately loaded with the space debris intended for recovery, the power subassembly 12 of the space debris vehicle 10 is separated from the capture subassembly 14 and is attached to the trailing end of the vehicle 160 in the manner shown in FIG. 9d. The domed recovery vehicle will be provided with an APU 163 for controlling the internal temperature of the recovery vehicle during its re-entry. The power subsystem is controllably fired as shown in FIG. 9e to cause deorbiting of the vehicle as shown at point 96 in FIG. 9f. The vehicle 160 will then leave its orbit 98, i.e., 400,000 feet and follow a predetermined re-entry trajectory 102 to a safe landing with the landing system 167, 169 and parachute 161 at landing site 103 on the Earth's surface 100 through utilization of any suitable landing system.

KINETIC ENERGY DESTRUCTION OF SPACE DEBRIS (FROM HIGHER ORBIT TO LEO)

Although it is considered necessary to provide for continuous cleaning of predetermined low orbit zones of orbiting space debris, it may nevertheless be inappropriate to accomplish destruction of the space debris by means of kinetic energy during atmospheric entry or by means of any other suitable energy source. It may also be appropriate to defer actual destruction of the space debris until some future time. For this reason, space debris may be removed from LEO to a higher Earth orbit such as the GEO to thus permit the space debris to be contained and parked at a known inactive orbital sector until its subsequent destruction or further handling can be accomplished. FIGS. 10a through 10h identify a sequence of collecting space debris and shifting it to a desired high orbit zone and then subsequently retrieving the space debris from its parking zone for kinetic energy destruction or destruction by any other suitable means. According to FIG. 10a the space debris vehicle 10 with its power and debris capture subsystems 12 and 14 are utilized to collect debris within a space debris receptacle in the manner described above. As shown in FIG. 10b the space debris vehicle 10 is shown to be ejecting a receptacle 44 filled with space debris into a large space debris container 80 as further described above. As shown in FIG. 10c the power subsystem 12 of the space debris vehicle 10 has been separated from the debris capture subsystem 14 and has been attached in powering relation with the large space debris container 80. The container 80 is shown to contain a plurality of filled space debris receptacles. With respect to FIG. 10c, it should be born in mind that the power supply subsystem 12, instead of the power subsystem of the space debris vehicle 10, may be a power supply subsystem with enhanced power capability to thus enable the power subsystem to propel the container 80 and its collection of filled debris receptacles from a launch site 180 at LEO to a higher orbit site 182 along a programmed flight path 184. Thus, after its collection in a LEO zone where it presents a hazard to spacecraft operations, the collected debris may be transferred to a high orbit location, i.e., parking orbit so that it will remain out of the way of spacecraft operations until its final disposal or removal is accomplished at some later date.

Figures 10E, 10F:
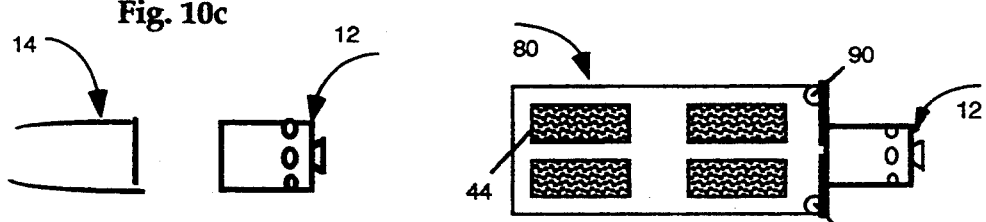
Figures 10G, 10H, 10I:
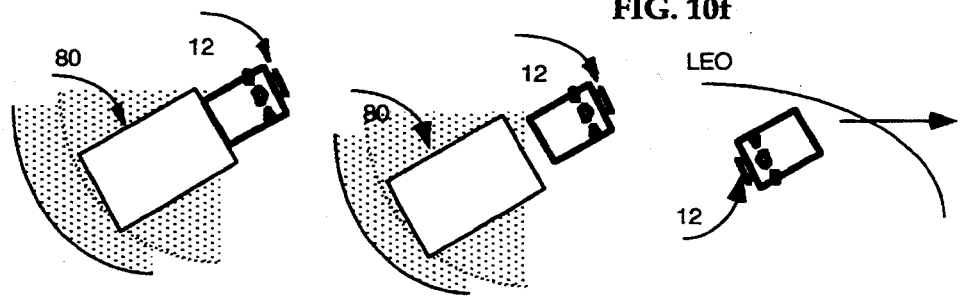
Figures 10J, 10K:
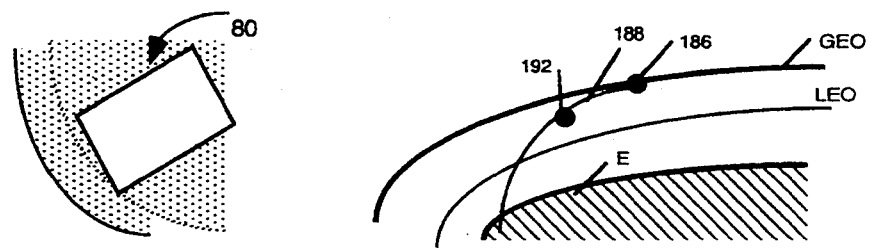

If disposal at a later date from the high orbit site 182 is to be accomplished by kinetic energy destruction, a power subsystem 12 can be disassembled from a space debris vehicle 10 as shown in FIG. 10e for attachment to the debris filled container 80 in the manner shown in FIG. 10f. Thereafter, the power subsystem 12 will be utilized as shown in FIG. 11g to shift the debris container 80 to a descent site 186. The power subsystem will then be separated from the debris container and will be maneuvered to a higher orbit where it will be parked to await subsequent reuse. The debris container and its debris will be vaporized to melted by kinetic energy between the region of GEO and LEO at 192.

EJECTION OF SPACE DEBRIS FROM EARTH ORBIT

In the event it should be decided that atmospheric disintegration of space debris and other components is inappropriate for any reason, the collected space debris may be removed from Earth orbit and placed into a solar orbit or transferred beyond solar orbit to interstellar space. This feature of the present invention will be accomplished according to Figs. 11a-11d. As in the other figure groups of this specification, FIG. 11a is representative of collecting orbiting space debris by means of a space debris vehicle 10. Space debris receptacles 44 will then be inserted into the debris container 80 in the manner shown in FIG. 11b after which the power subsystem 12 of the space debris vehicle 10, or an orbital ejection power system 193 of greater power capacity may be assembled to the debris container. The power subsystem 12 can then be appropriately fired to remove the debris filled container 80 from its orbit about the Earth E so that the container will be parked at an astroid zone A in an orbit about the sun S as shown in FIG. 11c. As shown in FIG. 11d the debris filled container 80 is shown in an orbit about the Earth E which obviously follows orbit 194 about the sun S. The orbit 196 of the debris filled container 80 about the Earth may be a LEO or a high Earth orbit such as the GEO. As shown by force arrow 198 force may be applied to the debris filled container 80 by the power subsystem 193 so as to eject the container and its contents from Earth orbit to solar orbit or beyond.

SOLAR ENERGY DESTRUCTION OF SPACE DEBRIS

It may be considered appropriate to accomplish removal of orbiting space debris by causing its destruction in the orbital environment. In the event such is desired, one suitable process for accomplishing orbital destruction of space debris may be through the use of solar energy.

According to scientific theory, the internal constitution of the stars estimate the sun's central temperature to be about 17,000,000 C, at which temperature fusion of hydrogen into helium takes place. The energy released during solar fusion provides solar energy ignition of 4E33 ergs. per second. Solar energy development programs are presently underway to provide for utilization of solar energy for power generation both in land based systems and for orbiting satellites, space stations and the like. A solar power generation facility is under development in Southern California. For satellites, as well as for land based facilities, solar panels are being utilized for the purpose of generating electrical power. The disposal systems for space debris will also be capable of employing solar energy for the purpose of demolishing non-valuable space debris.

FIG. 12a is again representative of a space debris vehicle 10 having a power subsystem 12 and a debris capture subsystem 14 and which is capable of capturing and accumulating space debris within an internal space debris receptacle 44 thereof. As shown in FIG. 12b a very large space debris container 200 is shown which defines a collection chamber 202 within which may be located a plurality of filled space debris receptacles 44. For access to the chamber 202 for the purpose of depositing a filled space debris filled receptacle 44 therein as shown at the right hand portion of FIG. 12b, a pair of opposed pivoting dampers 204 and 206 are shown in the closed positions thereof and are opened and closed by damper sensors 208 and 210 respectfully. The dampers 204 and 206 are opened to permit insertion of filled space debris receptacles through the opening 212 and are closed by the sensors immediately following ejection of the filled receptacle 44 into the chamber 202. The space debris container 200 need not be designed to withstand extraordinary forces such as would occur upon propulsion thereof from orbit or descent thereof through the atmosphere. It need only be of sufficient structural integrity to permit it to be moved to various locations while in orbit.

For solar energy destruction of the collected space debris, the very large space debris container 200 will be located within a destruction receptacle 214 shown in FIG. 12c which is shown to have closed side and bottom walls 216 and 218 respectively, with an open side at 220. With the receptacle 200 appropriately positioned relative to the destruction receptacle 214 a computerized solar lens shown generally at 222 is positioned between the sun S and the container 200 at such distance that the solar rays of the sun are focusing solar heat on a sufficiently large area to encompass the entirety of the debris container 200. The open side 220 of the destruction receptacle 214 would be oriented in a direction away from Earth so that any minute debris liberated during the debris destruction process would only be capable of propagating outwardly, away from the orbital zone that is primarily delegated for spacecraft operations. The solar lens 222 incorporates a computerized lens support platform having a plurality of control thrusters 226 and 228 for positioning thereof. The solar lens system incorporates a solar lens 230 of appropriate construction and configuration for focusing solar heat on a sufficiently large area to encompass the entirety of the debris container 200. The open side 220 of the destruction receptacle 214 would be oriented in a direction away from Earth so that any minute debris liberated during the debris destruction process would only be capable of propagating outwardly, away from the orbital zone that is primarily delegated for spacecraft operations. The solar lens system 222 would also be provided with an appropriate diaphragm or other suitable closure that would enable the lens to be selectively opened and closed so that the energy of the sun would be subjected to the space debris container 200 and its collected debris only under command from an appropriate command facility.

The solar lens system 222 is shown in greater detail in FIGS. 12d and 12e while the entire solar energy destruction system is depicted by way of block diagram in FIG. 12f. As shown particularly in FIG. 12d, the solar lens platform 224 in addition to providing support for a plurality of RCS thrusters 226, 227, 228 and 229 also provides support for a plurality of video cameras 231, 232, 233, and 235, a power supply 234, a reaction control subsystem 236 and a guidance control subsystem 238. The various video cameras establish reference angle viewing of the debris filled container 200 and the destruction receptacle 214 so as to permit proper computer controlled orientation of the solar lens platform relative thereto. The video cameras establish differential angle signals that are processed electronically to thereby provide a computer system of a control facility with the capability of determining energy input to the solar lens platform to appropriately position it relative to the sun and the space debris container for solar energy destruction of the space debris container and its collected contents.

As is clear from FIG. 12f the block diagram indicates that the power subsystem 234 is capable of supplying power to the RCS thrusters, the guidance control subsystem, and the solar dish or lens subsystem. The reaction control subsystem is employed for accomplishing maneuvering of the solar lens system so as to properly position it relative to the sun during periods of use and non-use. The guidance control subsystem provides guidance signals for operation of the RCS thrusters and provides appropriate communication with tracking stations or other control facilities. The solar lens subsystem includes a series of convex lenses, concave lenses, prisms and reflective mirrors which are used for appropriate concentration of the solar rays on the debris container 200.

LASER ENERGY DESTRUCTION OF SPACE DEBRIS

As depicted in FIGS. 13a–13c, it is also possible to utilize laser energy for the purpose of accomplishing orbital destruction of space debris. For this purpose, space debris would be collected in a large space debris container 200 in the same manner as discussed above in connection with FIGS. 12a and 12b. After collection of the space debris within the container 200, the container will be appropriately positioned for destruction relative to a laser energy generation system and relative to a destruction receptacle 240 having closed side and bottom walls 242 and 244 respectively and which is controllably positioned by a guidance and control platform 246 which is provided with RCS thrusters 248 and 250 to provide for its positioning control.

As shown in FIGS. 14a and 14b a laser generating device 252 is provided which is supported by a laser platform 254. The laser platform is provided with a plurality of RCS thrusters 256 which selectively emit thrust for controlling positioning of the laser platform 254. The laser platform is also provided with a plurality of video cameras 258 which are utilized for differential angle viewing of the debris container 200 and the destruction receptacle 240. The laser platform 254 also provides support for a power supply subsystem 260, a guidance control subsystem 262 and a reaction control subsystem 264. The laser platform 254 also provides sufficient power and electronics for generating a laser beam, which beam is concentrated by means of a laser lens 266.

The block diagram illustration of FIG. 14c illustrates the laser energy system of FIGS. 14a and 14b including the various power reaction control, guidance control and laser subsystems thereof.

NEWLY GENERATED SPACE DEBRIS

A new space debris region will be generated immediately after one of the following events occurs: use of an expandable upper stage rocket to boost a satellite from LEO to higher orbit or GEO, a propulsion system explosion and collision between debris objects or satellites. The U.S. Space Surveillance Network (SSN) and NASA Space Debris Optical Observation Center will be aware of the activities of any new region of space debris generation. In order to minimize the number of space debris objects in a region of interest, and to prevent the space debris from gradually propagating to a region of high density space activities, a ground tracking station should immediately dispatch a SDV 10 to capture the space debris as soon as activities in the new generated space debris region stabilize. The process of collecting space debris is identical to that illustrated in FIGS. 2 and 4a. The captured debris will be transported to a designated region and it will be disposed of or removed from orbit according to one of the methods disclosed herein. Current NASA U.S. Pat. No. 4,991,799 discloses a Space debris sweeper which is only capable of sweeping a small area of space and to remove only small space debris from the immediate proximity of an orbiter mission.

As shown in the block diagram presentation of FIG. 14c the laser energy system incorporates power, reaction control, guidance control and laser subsystems. The power supply subsystem provides operational power for the RCS thrusters and the GCS and laser subsystems. The reaction control subsystem provides for maneuvering of the laser platform in space for alignment of the laser beam from the source to the debris filled container 200. The guidance control subsystem provides for guidance of the reaction control subsystem and provides for communication with control facilities such as tracking stations. The laser subsystem provides for generation of laser energy and also provides for powering and control of the video cameras for achieving differential angle control and signal transmission thereof.

In view of the foregoing, it is evident that through the method and apparatus of the present invention there is provided a novel system for capturing orbiting space debris to eliminate its hazard to the orbital environment and for selectively eliminating the captured space debris from designated orbit zones. For elimination of space debris by disposal this invention utilizes the kinetic energy of space debris re-entry into the Earth's atmosphere. This invention also contemplates selective utilization of solar energy or laser energy for complete destruction of space debris. This invention further provides for elimination of the hazard of orbiting space debris by selectively positioning it in a safe parking orbit or ejecting it from Earth orbit to solar orbit. In the case of valuable space debris, this invention contemplates returning it to the Earth's surface by way of a thermally protected recovery vehicle for its restoration and reuse, salvage, or analysis.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A method for disposal of orbiting space debris, comprising:
   (a) placing a space debris vehicle in orbit, said space debris vehicle having a space debris capture subsystem and a power subsystem in releasable assembly, said space debris capture subsystem having a receptacle for receiving space debris and dampers and damper control sensors for receiving said space debris within said receptacle;
   (b) placing in orbit a debris container of a dimension for containing a predetermined volume of space debris;
   (c) maneuvering said space debris vehicle by means of said power subsystem for collection of space debris within said receptacle of said space debris capture subsystem;
   (d) by manipulation of said space debris dampers by means of said damper control sensors transferring collected space debris from said space debris capture subsystem into said debris container;
   (e) decoupling said power subsystem from said space debris capture subsystem;
   coupling said debris container in powering and maneuvering assembly with said space debris vehicle
   (g) initiating deorbiting maneuvering of said debris container;
   for entry into the Earth's atmosphere and for total destruction of said debris container and the space debris contained therein by means of heat developed by kinetic energy during entry into the Earth's atmosphere;
   (h) decoupling said power subsystem from said debris container when predetermined deorbiting of said debris container is assured; and
   (i) reorbiting said power subsystem for further handling of space debris.

2. The method of claim 1, wherein a space vehicle in Earth orbit executes a maneuver to change Earth orbit or to escape Earth orbit and generates space debris, said method further comprising:
   (a) immediately following said maneuver, with said power module, maneuvering said space debris vehicle to the orbital region of said maneuver; and
   (b) capturing said newly generated space debris from said orbital region before wide dispersal thereof within said orbital region.

3. The method of claim 1, wherein said space debris capture subsystem is adapted for containing a space debris receptacle and at least one space debris receptacle being in orbit along with said space debris vehicle, said method including:
   (a) during said maneuvering of said space debris vehicle, collecting space debris within a space debris receptacle separably located within said space debris capture subsystem;

(b) closing said dampers by manipulation of said damper control sensors to retain said space debris within said space debris receptacle; and (c) accomplishing said transferring by jettisoning said space debris receptacle and the space debris contained therein from said space debris capture subsystem of said space debris vehicle and into said space debris container.

4. The method of claim 3, including:

(a) prior to said deorbiting of said space debris container, jettisoning a number of space debris filled space debris receptacles from said space debris vehicle into said space debris container; and (b) closing said space debris container to prevent inadvertent separation of space debris or space debris receptacles therefrom.

5. The method of claim 1, including:

(a) providing video inspection of said space debris to assist in acquisition thereof by said space debris vehicle.

6. The method of claim 5, said space debris vehicle incorporates robotic arms having robot gripping hands and having at least one debris sweeper for manipulation by said robotic arms, said method further including:

with said robotic arms and said gripping robotic hands, establishing gripping of said space debris and moving said space debris into said space debris receptacle.

7. The method of claim 1, wherein said space debris capture subsystem includes a space debris receptacle removably located within said internal compartment and further includes a receptacle ejector for discharging said space debris receptacle from said internal chamber into said debris container, said method further comprising:

with said space debris vehicle in discharge orientation with said debris container, activating said receptacle ejector, thus ejecting a debris filled space debris receptacle from said internal compartment of said debris capture subsystem into said debris container for orbital storage and future deorbiting.

8. The method of claim 1, wherein said space debris capture subsystem incorporates a plurality of video cameras being specifically oriented relative to said space debris capture subsystem for differential angle viewing of space debris and providing differential angle signals enabling steering of said space debris vehicle for approach and alignment with said space debris and for controlled operation of said robotic arm and hand assembly for acquisition and handling of said space debris, said method further comprising:

(a) viewing said orbiting space debris with said video cameras during approach of said space debris vehicle thereto;

(b) generating electronic differential camera angle signals;

(c) transmitting said differential camera angle signals by telemetry to a signal processing facility; and (d) transmitting electronic steering signals from said signal processing facility to said power subsystem for maneuvering said space debris vehicle into debris capturing relation with said orbiting space debris.

9. The method of claim 1, further comprising:

initiating an Earth atmosphere entry sequence by controlled retrothrust of said power subsystem for deorbiting said debris container and causing the same to fly an entry trajectory toward an Earth zone of low population density during which said debris container and the captured space debris within said debris container will be melted and vaporized by heat induced thereto by the kinetic energy of atmospheric reentry.

10. A method for disposal of orbiting space debris, comprising:

(a) placing a space debris vehicle in Earth orbit said space debris vehicle having a power subsystem and a space debris capture subsystem said space debris capture subsystem having an internal compartment for receiving space debris and further having at least one robotic arm and hand assembly for capturing space debris and placing it within said internal compartment and having retainer means for securing space debris within said internal compartment;

(b) placing in orbit a debris container of a dimension for containing a predetermined volume of space debris:

(c) maneuvering said space debris vehicle by means of said power subsystem to orbiting space debris for collection thereof within said debris capture subsystem;

(d) with said robotic arm and hand assembly capturing space debris to which said space debris vehicle has maneuvered and placing it within said internal compartment;

(e) repeating said maneuvering and capturing of (c) and (d) above until said internal compartment is desirably filled with captured space debris;

(f) after said internal compartment has been suitably filled with captured space debris, maneuvering said space debris vehicle to rendezvous with said debris container;

(g) transferring said captured space debris from said internal compartment into said debris container; and (h) after said debris container has been sufficiently filled with space debris. deorbiting said space debris container and its contained space debris for entry. into the Earth's atmosphere and for total destruction of said debris container and the space debris contained therein by means of heat developed by kinetic energy during entry. into the Earth's atmosphere.

11. The method of claim 10, wherein said capture subsystem further incorporates at least one space debris sweeper for manipulation by said robotic arm and hand assembly, said method further comprising:

with said debris capture subsystem selectively positioned relative to orbiting space debris of insufficient size for grasping by said robotic arm and hand assembly, manipulating said space debris sweeper for contacting said space debris and directing it into said internal compartment.

12. The method of claim 10 wherein a space debris vehicle in an initial Earth orbit region executes a maneuver to change Earth orbit or to escape Earth orbit and said maneuver generates space debris which begins to disperse within said initial Earth orbit region, said method further comprising:

(a) immediately following said maneuver, with said power module, maneuvering said space debris vehicle to said initial Earth orbit region; and (b) capturing said newly generated space debris by means of said debris capture subsystem prior to wide dispersal thereof within said initial Earth orbit region.

13. A method for eliminating orbiting space debris from a designated orbit zone, comprising:
   (a) placing in said designated orbit zone at least one space debris vehicle having a power subsystem and a debris capture subsystem and at least one space debris receptacle, said space debris vehicle having the capability of being controllably maneuvered within said designated orbit zone to rendezvous with orbiting space debris therein;
   (b) placing a space debris container in an Earth orbit, said space debris container capable of receiving a plurality of said space debris receptacles;
   (c) coupling said space debris vehicle in powering and maneuvering assembly with said space debris container after said space debris container has been suitably filled with space debris receptacles containing space debris;
   (d) maneuvering said space debris vehicle with said space debris container for rendezvous with selected space debris;
   (e) capturing said orbiting space debris; and
   (f) controllably energizing said power subsystem for changing the altitude and orbit zone of said space debris vehicle thus removing said space debris from said designated orbit zone.

14. The method of claim 13, wherein said removing comprises:
   causing controlled entry of said space debris into the Earth's atmosphere for complete destruction of said space debris by heat induced thereto by kinetic energy.

15. Apparatus for removing orbiting space debris from a designated orbital zone about the earth, comprising:
   (a) a space debris vehicle having a power subsystem incorporating a primary source of motive thrust and a plurality of directional control thrusters for orbital maneuvering and having a debris capture subsystem being separably connected to said power subsystem and defining an internal chamber and means for selectively closing said internal chamber, said debris capture subsystem further having means for directing space debris into said internal chamber and having a plurality of video cameras for differential angle visualization of space debris being approached and captured, said space debris vehicle further having an on board computer for controlling power and operational functions of said power subsystem and said debris capture subsystem; and
   (b) a space debris container adapted to receive and contain a plurality of space debris receptacles containing space debris captured and deposited therein by said debris capture subsystem of said space debris vehicle, said space debris container being further adapted to receive said power subsystem in maneuvering connection therewith for selective power energized removal thereof from said designated orbit zone about the earth by selective deorbiting thereof for kinetic energy destruction upon Earth atmosphere reentry, by selective boosting thereof to a high parking orbit, by selective ejection thereof from Earth orbit and by selective destruction thereof while in orbit.

16. The apparatus of claim 15, wherein said space debris vehicle further includes:
   (a) a debris receptacle being removably retained within said internal chamber and a debris receptacle ejector for displacing a filled debris receptacle from said internal chamber into said space debris container;
   (b) said space debris container adapted to receive a plurality of space debris receptacles in retained relation therein; and
   (c) said space debris vehicle having at least one robotic arm and hand assembly for gripping space debris and placing it within said space debris receptacle and a space debris sweeper adapted for manipulation by said robotic arm and hand assembly for sweeping small space debris into said space debris receptacle.

17. A method for removing space debris from Earth orbit, comprising:
   (a) placing a space debris vehicle in Earth orbit, said space debris vehicle having a space debris capture subsystem and a power subsystem;
   (b) placing in Earth orbit a debris container of a dimension for containing a predetermined volume of space debris;
   (c) maneuvering said space debris vehicle by means of said power subsystem for collection of space debris;
   (d) depositing said space debris within said debris container by means of said space debris capture subsystem and said power subsystem; and
   (e) placing said debris container with said space debris therein in solar orbit by controlled thrust of said power subsystem.

18. The method of claim 17, including:
   (a) after placing said debris container in Solar orbit, separating said space debris vehicle from said debris container; and
   (b) returning said space debris vehicle to a desired Earth orbit by controlled thrust of said power subsystem.

19. A method for removing space debris from Earth orbit, comprising:
   (a) placing a space debris vehicle in Earth orbit, said space debris vehicle having a space debris capture subsystem and a power subsystem, said power subsystem being capable of controlled reentry of the Earth's atmosphere and controlled soft landing on the Earth and capable of protecting said space debris and said space debris vehicle from damage during reentry and soft landing;
   (b) placing in Earth orbit a modified recovery module of a dimension for containing and protecting a predetermined volume of space debris;
   (c) maneuvering said space debris vehicle by means of said power subsystem for collection of space debris;
   (d) by means of said capture subsystem acquiring said space debris and placing said space debris within said modified recovery module;
   (e) separating said capture subsystem from said space debris vehicle;
   (f) coupling said power subsystem with said modified recovery module; and
   (g) by controlled activation of said power subsystem causing reentry and soft landing of said space debris vehicle and said modified recovery module and said space debris contained therein.

20. The method of claim 19, wherein:

said space debris vehicle incorporates a landing system having a parachute system for stabilization and Earth atmosphere braking and a landing system for said soft Earth landing, said method further comprising:

causing controlled reentry and soft Earth landing of said space debris vehicle and said modified recovery module to permit undamaged recovery and salvage of said space debris.

21. The method of claim 19 wherein said space debris vehicle incorporates an auxiliary power supply and a thermal control system, said method further comprising:

controlling the temperature within said modified recovery module to protect valuable space debris during said Earth atmosphere reentry and soft landing by controlled activation of said thermal control system by said auxiliary power supply.

22. A method for capture and recovery of space debris from selected earth orbit zones, comprising:

(a) placing a space debris vehicle in a designated earth orbit, said space debris vehicle having a space debris capture subsystem and a power subsystem, said space debris capture subsystem having a robotic system including robotic arm and hand assemblies for establishing physical connection with said space debris and for moving said space debris relative to said space debris capture subsystem, said space debris capture subsystem further having a video camera system for use in identifying the location of space debris relative to said space debris capture subsystem and monitoring connection of said robotic arms and hand assemblies with and positioning of space debris by means of said robotic arm and hand assemblies:

(b) placing in earth orbit a modified recovery module of a dimension for containing and protecting said space debris;

(c) maneuvering said space debris vehicle by means of said power subsystem for selective collection of space debris by said robotic arm and hand assemblies;

(d) by means of said robotic arm and hand assemblies inserting said space debris into said modified recovery module;

(e) preparing said modified recovery module for deorbit maneuvering by coupling said space debris vehicle therewith;

(f) by means of said power subsystem, maneuvering said space debris vehicle with said modified recovery module coupled therewith to achieve deorbit maneuvering thereof;

(g) after assurance of deorbiting of said modified recovery module, separating said space debris vehicle from said modified recovery module and maneuvering said space debris vehicle to a designated orbit; and (h) controlling deorbiting of said modified recovery module to soft landing at a designated landing site on the earth's surface.

23. The method of claim 22, wherein said modified recovery module incorporates a parachute system for controlled reentry and controlled descent to soft landing, said method further comprising;

controllably deploying said parachute system for stabilization of said modified recovery module during reentry and for assisting in deceleration of said reentry to soft, parachute controlled landing at said designated landing site.

24. The method of claim 23, wherein said modified recovery module incorporates a landing gear system for achieving soft, controlled landing at a designated landing site on the Earth's surface, said method further comprising:

(a) deploying said landing gear system after reentry velocity of said modified recovery module has decreased to a predetermined landing velocity;

(b) deploying said parachute system for parachute slowed landing of said modified recovery module at said designated landing site.

25. The method of claim 22, wherein said space debris capture subsystem incorporates a plurality of elongate tether elements for external physical connection of said space debris with said space debris, said method further comprising (a) manipulating said elongate tether elements for tether attachment of said space debris to said debris capture subsystem;

(b) by means of said power subsystem, maneuvering said space debris vehicle with said space debris tethered thereto to a designated orbital region being well away from said predetermined orbital zone;

(c) releasing said plurality of elongate tether elements from said space debris; and (d) with said power subsystem, returning said space debris vehicle to said designated earth orbit.

26. The method of claim 25, including:

(a) attaching said elongate tethering elements to said space debris;

(b) with said power subsystem maneuvering said space debris vehicle and towing said space debris to the immediate vicinity of said modified recovery module;

(c) placing said space debris within said modified recovery module; and (d) returning said modified recovery module from orbit to a designated landing site.

27. Apparatus for recovery of space debris from a designated earth orbit zone, comprising:

(a) a space debris vehicle having a debris capture subsystem and a power subsystem said debris capture subsystem having a receptacle therein for receiving space debris;

(b) a plurality of elongate tethering elements being provided on said debris capture subsystem and being adapted for external attachment to inactive satellites and other large space debris;

(c) a robotic arm and hand system being provided on said debris capture subsystem for grappling onto space debris and for controllably moving said space debris relative to said space debris vehicle;

(d) a video camera system being provided on said debris capture subsystem for viewing space debris in the near vicinity of said space debris vehicle and enabling ground control personnel to receive video signals therefrom and visually monitor operation of said robotic arm and hand system and said elongate tether elements during handling of space debris by said debris capture subsystem.

28. The apparatus of claim 27, including:

(a) a modified recovery module being placed in said orbital zone and being adapted for receiving said space debris therein and for protecting said space debris during reentry through the earth's atmosphere to soft landing on the earth's surface, said modified recovery module having a parachute system for stabilizing said modified recovery module during a portion of its reentry and slowing said modified recovery module to a predetermined velocity;

(b) a landing system being provided on said modified recovery module and including deployable landing gear for permitting runway landing of said modified recovery module at a designated landing site on the Earth's surface; and (c) a thermal control system being provided for said modified recovery module for providing thermal protection for said space debris during reentry thereof.

29. The apparatus of claim 28, wherein said modified recovery module is an aeroassist flight experiment type recovery vehicle.

30. The apparatus of claim 28, wherein said modified recovery module is a biconic type recovery vehicle.

31. The apparatus of claim 28, wherein said modified recovery vehicle is a mushroom type recovery vehicle.

32. The apparatus of claim 28, wherein said modified recovery module is a domed type recovery vehicle.

* * * * *